US012782715B2

(12) United States Patent
Suina

(10) Patent No.: US 12,782,715 B2
(45) Date of Patent: Nov. 3, 2026

(54) ABNORMALITY DETECTION APPARATUS, ABNORMALITY DETECTION METHOD, AND PROGRAM

(71) Applicant: STANLEY ELECTRIC CO., LTD., Tokyo (JP)

(72) Inventor: Kenji Suina, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 178 days.

(21) Appl. No.: 18/858,382

(22) PCT Filed: Apr. 10, 2023

(86) PCT No.: PCT/JP2023/014631

§ 371 (c)(1),
(2) Date: Oct. 21, 2024

(87) PCT Pub. No.: WO2023/204092

PCT Pub. Date: Oct. 26, 2023

(65) Prior Publication Data

US 2025/0271659 A1 Aug. 28, 2025

(30) Foreign Application Priority Data

Apr. 22, 2022 (JP) ................................ 2022-070508

(51) Int. Cl.
*G02B 26/08* (2006.01)
*G02B 26/10* (2006.01)

(52) U.S. Cl.
CPC ....... *G02B 26/101* (2013.01); *G02B 26/0816* (2013.01)

(58) Field of Classification Search
CPC ......................... G02B 26/101; G02B 26/0816; G02B 26/105; G02B 26/0858
See application file for complete search history.

(56) References Cited

U.S. PATENT DOCUMENTS 11,846,770 B2 12/2023 Nishioka
2020/0403626 A1* 12/2020 Stelzer ................. G02B 26/105
2021/0231946 A1* 7/2021 Nishioka .............. G02B 26/127

FOREIGN PATENT DOCUMENTS

JP 2021117273 A 8/2021

OTHER PUBLICATIONS

International Search Report (ISR) (and English language translation thereof) dated Jun. 20, 2023, issued in International Application No. PCT/JP2023/014631.

(Continued)

*Primary Examiner* — Euncha P Cherry
(74) *Attorney, Agent, or Firm* — Holtz, Holtz & Volek PC

(57) ABSTRACT

An abnormality detection apparatus, which detects abnormality of a resonant sensor signal output from a sensor unit of an optical deflector, includes: a resonant sensor signal processing unit including a function of A/D-converting the resonant sensor signal output from the sensor unit into resonant sensor signal data, and a function of outputting a data acquisition completion and the A/D-converted resonant sensor signal data; a resonant sensor signal predicted-data calculation unit configured to calculate predicted data on the resonant sensor signal; and a resonant sensor signal abnormality determination unit configured, in a case where the mirror portion is in a resonant state, to compare the predicted data on the resonant sensor signal with actual resonant sensor signal data, and to detect abnormality of the resonant sensor signal based on a result of the comparison.

6 Claims, 14 Drawing Sheets

(56) References Cited

OTHER PUBLICATIONS

Written Opinion dated Jun. 20, 2023, issued in International Application No. PCT/JP2023/014631.

* cited by examiner

ABNORMALITY DETECTION APPARATUS, ABNORMALITY DETECTION METHOD, AND PROGRAM

TECHNICAL FIELD

The present disclosure relates to an abnormality detection apparatus, an abnormality detection method, and a program, and in particular, to an abnormality detection apparatus that can detect abnormality of a resonant sensor signal (resonant sensor signal output from optical deflector in response to swinging of mirror portion) without determining whether an amplitude (phase difference) is within an allowable range.

BACKGROUND ART

An illumination apparatus that includes an optical deflector, determines whether an amplitude (phase difference) of a driving signal applied to the optical deflector (actuator) is within an allowable range, and in a case where it is determined that the amplitude (phase difference) is out of the allowable range as a result, performs abnormality processing is known (for example, see Patent Literature 1).

CITATION LIST

Patent Literature

Patent Literature 1: Japanese Unexamined Patent Application Publication No. 2021-117273

SUMMARY OF INVENTION

Technical Problem

However, as a result of studies, the present inventors have found that, even when the amplitude (phase difference) is within the allowable range, abnormality such as change in an A/D conversion result (resonant sensor signal data) may occur due to a failure of an A/D converter (A/D converter A/D-converting resonant sensor signal into resonant sensor signal data), noise occurrence, and the like, and the apparatus disclosed in Patent Literature 1 cannot detect abnormality of this kind.

An object of the present disclosure, which has been made to solve such a problem, is to provide an abnormality detection apparatus, an abnormality detection method, and a program that can detect abnormality of a resonant sensor signal (resonant sensor signal output from optical deflector in response to swinging of mirror portion) without determining whether an amplitude (phase difference) is within an allowable range.

Solution to Problem

An abnormality detection apparatus according to the present disclosure is an abnormality detection apparatus detecting abnormality of a resonant sensor signal output from a sensor unit of an optical deflector. The optical deflector includes a mirror portion, a supporting portion supporting the mirror portion, at least one actuator swinging the mirror portion around a swing axis relative to the supporting portion in response to application of a resonant control signal, and the sensor unit outputting the resonant sensor signal in response to swinging of the mirror portion. The abnormality detection apparatus includes: a data acquisition timing generation unit configured to output a data acquisition request at each prescribed period; a resonant sensor signal processing unit including a function of A/D-converting the resonant sensor signal output from the sensor unit into resonant sensor signal data every time receiving the data acquisition request, and a function of outputting a data acquisition completion and the A/D-converted resonant sensor signal data every time the A/D conversion is completed; a phase change amount calculation unit configured to calculate a phase change amount that is a difference between a phase of the resonant driving signal applied to the actuator and a phase of the resonant driving signal previously applied to the actuator every time receiving the data acquisition request; a quadrature detection unit configured to acquire an amplitude of the resonant sensor signal output from the sensor unit, and a phase difference between the resonant driving signal and the resonant sensor signal; a resonant sensor signal predicted-phase calculation unit configured to calculate a predicted phase of the resonant sensor signal based on the phase change amount every time receiving the data acquisition completion; a resonant sensor signal predicted-data calculation unit configured to calculate predicted data on the resonant sensor signal based on the amplitude of the resonant sensor signal, the phase difference, and the predicted phase every time receiving the data acquisition completion; and a resonant sensor signal abnormality determination unit configured, in a case where the mirror portion is in a resonant state, to compare the predicted data on the resonant sensor signal with actual resonant sensor signal data, and to detect abnormality of the resonant sensor signal based on a result of the comparison.

With such a configuration, abnormality of the resonant sensor signal (resonant sensor signal output from optical deflector in response to swinging of mirror portion) can be detected without determining whether the amplitude (phase difference) is within an allowable range.

In the above-described abnormality detection apparatus, in a case where a difference between the predicted data on the resonant sensor signal and the actual resonant sensor signal data exceeds a threshold, the resonant sensor signal abnormality determination unit may detect abnormality of the resonant sensor signal.

Further, in the above-described abnormality detection apparatus, in a case where abnormality of the resonant sensor signal is detected, the resonant sensor signal abnormality determination unit may output a resonant sensor signal abnormality signal.

The above-described abnormality detection apparatus may further include: an average phase difference calculation unit configured, in the case where the mirror portion is in the resonant state, to calculate an average phase difference that is an average of a plurality of the phase differences acquired in past; a phase difference calculation unit configured to calculate a difference between the phase difference and the average phase difference; and a resonant driving signal frequency control unit configured to increase/reduce a frequency of the resonant driving signal so as to reduce the difference between the phase difference and the average phase difference.

Advantageous Effects of Invention

According to the present disclosure, it is possible to provide the abnormality detection apparatus, the abnormality detection method, and the program that can detect abnormality of the resonant sensor signal (resonant sensor signal output from optical deflector in response to swinging of mirror portion) without determining whether the amplitude (phase difference) is within the allowable range.

BRIEF DESCRIPTION OF DRAWINGS

FIG. 5 illustrates examples of a resonant driving signal applied to the optical deflector 1 (first piezoelectric actuators 31 and 32), a resonant sensor signal output from the optical deflector 1 (first detection units 71*y* and 72*y*), and the like;

DESCRIPTION OF EMBODIMENTS

Figure 1:
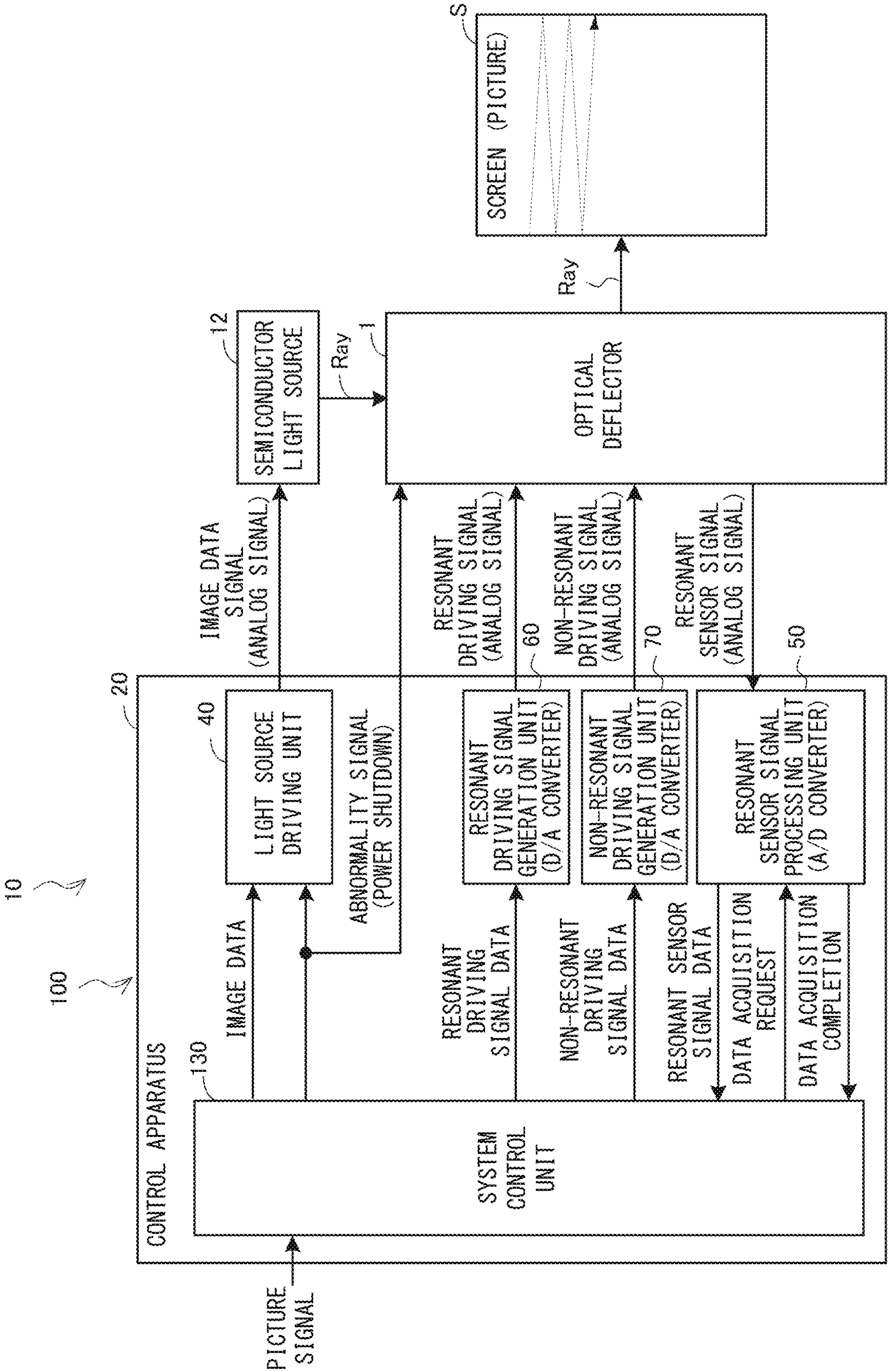
FIG. 1 is a schematic configuration diagram of a picture projection apparatus 10.

A picture projection apparatus 10 including an abnormality detection apparatus 100 according to an embodiment of the present disclosure is described below with reference to accompanying drawings. Corresponding components in the drawings are denoted by the same reference numerals, and repetitive description is omitted.

FIG. 1 is a schematic configuration diagram of the picture projection apparatus 10.

As illustrated in FIG. 1, the picture projection apparatus 10 includes a semiconductor light source 12, an optical deflector 1 projecting a picture on a screen S by performing two-dimensional scanning (in horizontal direction and vertical direction) with a laser beam Ray emitted from the semiconductor light source 12, and a control apparatus 20. Although not illustrated, a condenser lens that condenses the laser beam Ray emitted from the semiconductor light source 12 may be provided between the semiconductor light source 12 and the optical deflector 1. Further, although not illustrated, a screen member (for example, phosphor plate) on which a picture is drawn with the laser beam Ray scanned by the optical deflector 1, and a projection lens projecting the picture drawn on the screen member to the screen S may be provided.

The semiconductor light source 12 is, for example, a laser diode (LD) emitting the laser beam Ray having an emission wavelength in a blue color region. The laser beam Ray emitted from the semiconductor light source 12 enters the optical deflector 1 (mirror portion 2).

Next, the optical deflector 1 is described.

The optical deflector 1 includes the mirror portion 2 (for example, MEMS mirror) receiving the laser beam Ray emitted from the semiconductor light source 12 and performing two-dimensional scanning (in horizontal direction and vertical direction) with the received laser beam Ray. A picture is drawn on the screen S with the laser beam Ray scanned by the optical deflector 1.

The optical deflector 1 is, for example, a MEMS scanning mirror device (MEMS scanner). Major systems of driving the optical deflector 1 include a piezoelectric system, an electrostatic system, and an electromagnetic system, and any of the systems is usable. In the following, the optical deflector 1 of the piezoelectric system (uniaxial non-resonant/uniaxial resonant type) is described.

Figure 2:
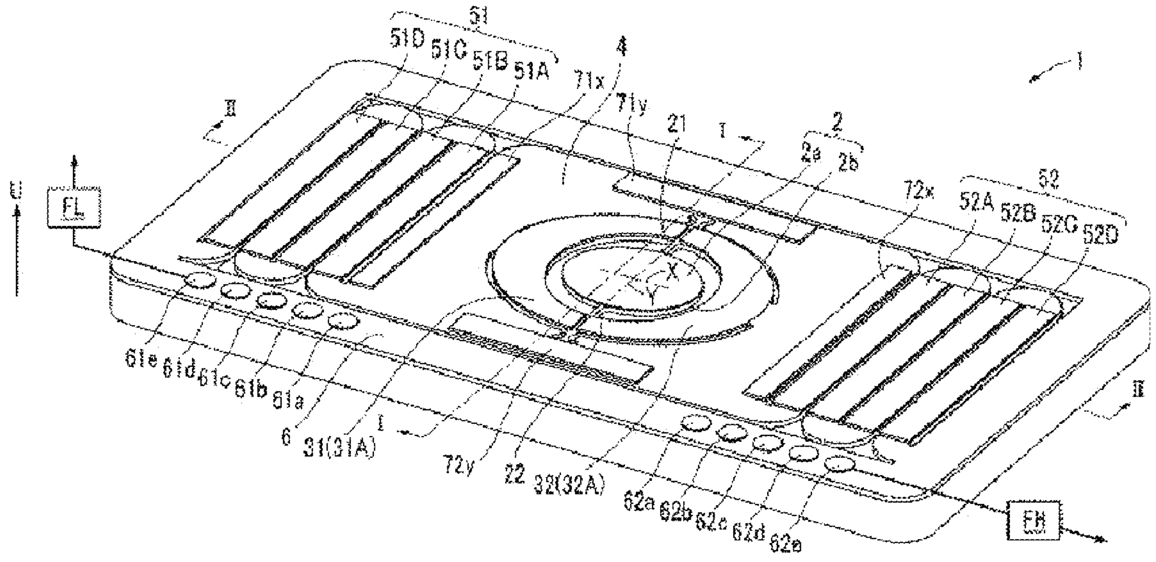
FIG. 2 is a perspective view of an optical deflector 1 of a uniaxial non-resonant/uniaxial resonant type.

FIG. 2 is a perspective view of the optical deflector 1 of the uniaxial non-resonant/uniaxial resonant type.

The optical deflector 1 includes the mirror portion 2, paired first piezoelectric actuators 31 and 32 (examples of actuator according to present disclosure), a first supporting portion 4 (example of supporting portion according to present disclosure), paired second piezoelectric actuators 51 and 52, and a second supporting portion 6.

The mirror portion 2 includes a reflection surface 2*a* that has a circular shape and reflects incident light, and a reflection surface supporting body 2*b* that has a circular shape and supports the reflection surface 2*a*.

The reflection surface supporting body 2*b* is formed from a silicon substrate. Paired torsion bars 21 and 22 extending outward from both ends of the reflection surface supporting body 2*b* are coupled to the reflection surface supporting body 2*b*.

The first piezoelectric actuators 31 and 32 are each formed in a semi-arc shape, and are disposed at intervals so as to surround the mirror portion 2. One ends of the respective first piezoelectric actuators 31 and 32 are oppositely coupled to each other with one torsion bar 21 in between, and the other ends of the respective first piezoelectric actuators 31 and 32 are oppositely coupled to each other with the other torsion bar 22 in between.

The first supporting portion 4 is formed in a rectangular frame shape, and is provided so as to surround the mirror portion 2 and the first piezoelectric actuators 31 and 32. The first supporting portion 4 is coupled to outsides at center positions of arc portions of the first piezoelectric actuators 31 and 32, and supports the mirror portion 2 through the first piezoelectric actuators 31 and 32.

The second piezoelectric actuators 51 and 52 are oppositely disposed with the first supporting portion 4 in between. Front end parts of the second piezoelectric actuators 51 and 52 are coupled to paired sides of the first supporting portion 4 in a direction orthogonal to the torsion bars 21 and 22.

The second supporting portion 6 is formed in a rectangular frame shape, and is provided so as to surround the first supporting portion 4 and the second piezoelectric actuators 51 and 52. The other ends of the second piezoelectric actuators 51 and 52 on sides not coupled to the first supporting portion 4 are coupled to the second supporting portion 6. Accordingly, the second supporting portion 6 supports the first supporting portion 4 through the second piezoelectric actuators 51 and 52.

Next, detailed configurations of the first piezoelectric actuators 31 and 32 are described. The first piezoelectric actuators 31 and 32 respectively include first piezoelectric cantilevers 31A and 32A each configured to be bent and deformed by piezoelectric driving. More specifically, one first piezoelectric actuator 31 of the first piezoelectric actuators 31 and 32 includes one first piezoelectric cantilever 31A, and the other first piezoelectric actuator 32 of the first piezoelectric actuators 31 and 32 includes the other first piezoelectric cantilever 32A. The first piezoelectric actuators 31 and 32 can swing the mirror portion 2 around a first axis Y relative to the first supporting portion 4, through the torsion bars 21 and 22 by bending deformation of the first piezoelectric cantilevers 31A and 32A. The first axis Y is an example of a swing axis according to the present disclosure.

Next, detailed configurations of the second piezoelectric actuators 51 and 52 are described. The second piezoelectric actuators 51 and 52 include paired second piezoelectric cantilevers 51A to 51D and 52A to 52D each configured to be bent and deformed by the piezoelectric driving. More specifically, one second piezoelectric actuator 51 of the paired second piezoelectric actuators 51 and 52 includes one-side second piezoelectric cantilevers 51A to 51D that are four piezoelectric cantilevers. The other second piezoelectric actuator 52 of the paired second piezoelectric actuators 51 and 52 includes the other-side second piezoelectric cantilevers 52A to 52D that are four piezoelectric cantilevers.

Both ends of the one-side second piezoelectric cantilevers 51A to 51D are adjacent to one another such that length directions thereof are directed in the same direction. In addition, the one-side second piezoelectric cantilevers 51A to 51D are arranged side by side at predetermined intervals so as to swing the mirror portion 2 around the second axis X (axis orthogonal to first axis Y; however, second axis X is not required to be accurately orthogonal to first axis Y). The one-side second piezoelectric cantilevers 51A to 51D are coupled such that each of the one-side second piezoelectric cantilevers 51A to 51D is folded back relative to an adjacent piezoelectric cantilever.

As with the one-side second piezoelectric cantilevers 51A to 51D, both ends of the other-side second piezoelectric cantilevers 52A to 52D are adjacent to one another such that length directions thereof are directed in the same direction. In addition, the other-side second piezoelectric cantilevers 52A to 52D are arranged side by side at predetermined intervals so as to swing the mirror portion 2 around the second axis X. The other-side second piezoelectric cantilevers 52A to 52D are coupled such that each of the other-side second piezoelectric cantilevers 52A to 52D is folded back relative to an adjacent piezoelectric cantilever.

As described above, in the one second piezoelectric actuator 51 and the other second piezoelectric actuator 52, the one-side the second piezoelectric cantilevers 51A to 51D and the other-side second piezoelectric cantilevers 52A to 52D respectively forming the one second piezoelectric actuator 51 and the other second piezoelectric actuator 52 are formed in a so-called meander shape (or bellows shape).

Among the one-side second piezoelectric cantilevers 51A to 51D and the other-side second piezoelectric cantilevers 52A to 52D, one ends (free ends) of the piezoelectric cantilevers (hereinafter, referred to as "first second piezoelectric cantilevers") 51A and 52A disposed on the mirror portion 2 side (first supporting portion 4 side) on sides not coupled to the respective adjacent second piezoelectric cantilevers (hereinafter, referred to as "second second piezoelectric cantilevers") 51B and 52B are coupled to an outer peripheral portion of the first supporting portion 4.

Likewise, among the one-side second piezoelectric cantilevers 51A to 51D and the other-side second piezoelectric cantilevers 52A to 52D, one ends (free ends) of the piezoelectric cantilevers (hereinafter, referred to as "fourth second piezoelectric cantilevers") 51D and 52D disposed on the second supporting portion 6 side on sides not coupled to the respective adjacent second piezoelectric cantilevers (hereinafter, referred to as "third second piezoelectric cantilevers") 51C and 52C are coupled to an inner peripheral portion of the second supporting portion 6.

Accordingly, the first supporting portion 4 can be swung around the second axis X relative to the second supporting portion 6 by bending deformation of the second piezoelectric cantilevers 51A to 51D and 52A to 52D that constitute the second piezoelectric actuators 51 and 52.

In the following, among the paired piezoelectric cantilevers 51A to 51D and 52A to 52D, the piezoelectric cantilevers disposed in odd numbers counted from the mirror portion 2 (first second piezoelectric cantilevers 51A and 52A, and third second piezoelectric cantilevers 51C and 52C) are referred to as odd-numbered second piezoelectric cantilevers 51A, 51C, 52A, and 52C.

Further, among the odd-numbered second piezoelectric cantilevers 51A, 51C, 52A, and 52C, the odd-numbered second piezoelectric cantilevers included in the one-side second piezoelectric cantilevers 51A to 51D are referred to as the one-side odd-numbered second piezoelectric cantilevers 51A and 51C, and the odd-numbered second piezoelectric cantilevers included in the other-side second piezoelectric cantilevers 52A to 52D are referred to as the other-side odd-numbered second piezoelectric cantilevers 52A and 52C.

Likewise, among the paired second piezoelectric cantilevers 51A to 51D and 52A to 52D, the piezoelectric cantilevers disposed in even numbers counted from the mirror portion 2 (second second piezoelectric cantilevers 51B and 52B, and fourth second piezoelectric cantilevers 51D and 52D) are referred to as even-numbered second piezoelectric cantilevers 51B, 51D, 52B, and 52D.

Further, among the even-numbered second piezoelectric cantilevers 51B, 51D, 52B, and 52D, the even-numbered second piezoelectric cantilevers included in the one-side second piezoelectric cantilevers 51A to 51D are referred to as the one-side even-numbered second piezoelectric cantilevers 51B and 51D, and the even-numbered second piezoelectric cantilevers included in the other-side second piezoelectric cantilevers 52A to 52D are referred to as the other-side even-numbered second piezoelectric cantilevers 52B and 52D.

Figure 3A:
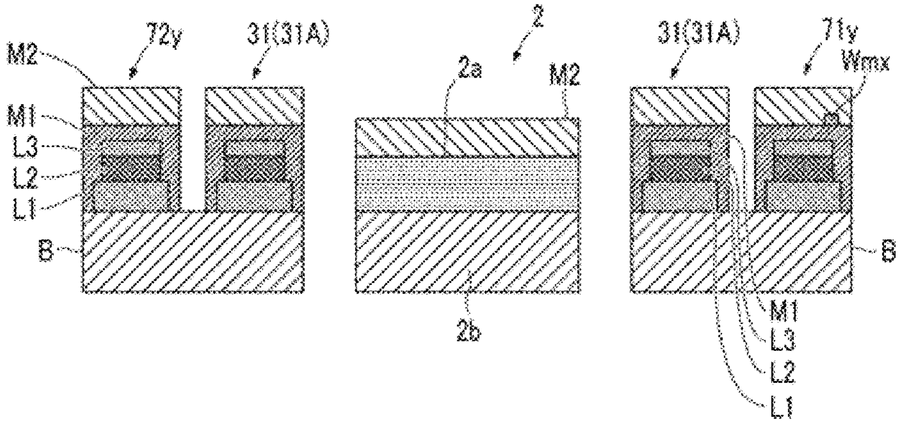
FIG. 3A is a diagram schematically illustrating an end surface taken along line I-I of the optical deflector in FIG. 2.
Figure 3B:
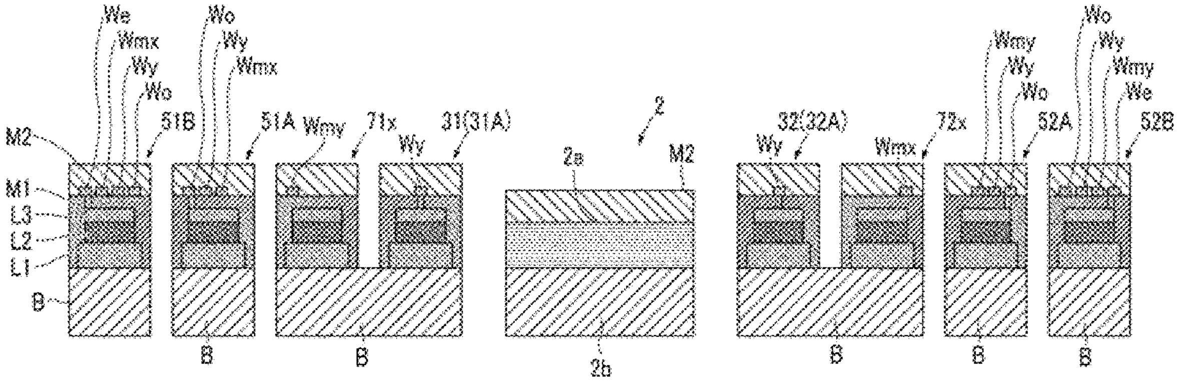
FIG. 3B is a diagram schematically illustrating an end surface taken along line II-II.

FIG. 3A and FIG. 3B are schematic end views of the optical deflector 1. FIG. 3A is an end view taken along line I-I in FIG. 2. In FIG. 3A, however, illustration of the second supporting portion 6 is omitted. FIG. 3B is an end view taken along line II-II in FIG. 2. In FIG. 3B, however, illustration of the second supporting portion 6 and the third second piezoelectric cantilevers 51C and 52C and the fourth second piezoelectric cantilevers 51D and 52 among the paired second piezoelectric cantilevers 51A to 51D and 52A to 52D is omitted.

Each of the third second piezoelectric cantilevers 51C and 52C has the configuration same as the configuration of each of the first second piezoelectric cantilevers 51A and 52A. Likewise, each of the fourth second piezoelectric cantilevers 51D and 52D has the configuration same as the configuration of each of the second second piezoelectric cantilevers 51B and 52B.

Each of the first piezoelectric cantilevers 31A and 32A that constitute the first piezoelectric actuators 31 and 32 and the paired second piezoelectric cantilevers 51A to 51D and 52A to 52D that constitute the second piezoelectric actuators 51 and 52 is a piezoelectric cantilever including a structure in which a lower electrode L1, a piezoelectric body L2, and an upper electrode L3 are stacked on a layer of a supporting body B as a strain body (cantilever main body).

As the detailed structure of each piezoelectric cantilever, the lower electrode L1, the piezoelectric body L2, and the upper electrode L3 are stacked on the layer of the supporting body B, and an interlayer insulation film M1 is provided so as to surround the lower electrode L1, the piezoelectric body L2, and the upper electrode L3. Further, upper electrode wires W are stacked on the interlayer insulation film M1, and a passivation film M2 is provided so as to surround the upper electrode wires W.

Note that, as described below, the upper electrode wires W include first driving upper electrode wires Wy, second driving odd-numbered-use upper electrode wires Wo, second driving even-numbered-use upper electrode wires We, first detection upper electrode wires Wmy, and second detection upper electrode wires Wmx, and in a case where it is unnecessary to particularly distinguish the wires from one another, the wires are referred to as the upper electrode wires W.

The piezoelectric body L2 of each of these piezoelectric cantilevers 31A, 32A, 51A to 51D, and 52A to 52D is bent and deformed by the piezoelectric driving when the driving voltage is applied between the upper electrode L3 and the lower electrode L1. Each of the piezoelectric cantilevers 31A, 32A, 51A to 51D, and 52A to 52D is bent and deformed along with bending deformation of the corresponding piezoelectric body L2.

Note that, at a coupling portion between each of the paired second piezoelectric cantilevers 51A to 51D and 52A to 52D that constitute the second piezoelectric actuators 51 and 52, and the piezoelectric cantilever adjacent thereto, the supporting bodies B of the adjacent piezoelectric cantilevers are integrally coupled, and no piezoelectric body L2 and no upper electrode L3 are provided at the coupling portion.

First detection units 71*y* and 72*y* (examples of sensor unit according to present disclosure) and second detection units 71*x* and 72*x* are provided on the first supporting portion 4. The first detection units 71*y* and 72*y* are disposed, on the first supporting portion 4, at center parts of sides of the first supporting portion 4 parallel to the second axis X (sides orthogonal to sides in longitudinal direction of second piezoelectric cantilevers 51A to 51D and 52A to 52D) along the sides.

The second detection units 71*x* and 72*x* are disposed, on the first supporting portion 4, at center parts of sides of the first supporting portion 4 parallel to the first axis Y along the sides. The first detection units 71*y* and 72*y* and the second detection units 71*x* and 72*x* are provided separately from each other in a plane.

The first detection units 71*y* and 72*y* are provided as sensors detecting first oscillation transmitted to the first supporting portion 4 when the mirror portion 2 is swung around the first axis Y relative to the first supporting portion 4 by piezoelectric driving of the first piezoelectric actuators 31 and 32. The second detection units 71*x* and 72*x* are provided as sensors detecting second oscillation transmitted to the first supporting portion 4 when the first supporting portion 4 is swung around the second axis X relative to the second supporting portion 6 by piezoelectric driving of the second piezoelectric actuators 51 and 52.

As with the first piezoelectric cantilevers 31A and 32A and the second piezoelectric cantilevers 51A to 51D and 52A to 52D, each of the first detection units 71*y* and 72*y* and the second detection units 71*x* and 72*x* has the structure in which the lower electrode L1, the piezoelectric body L2, and the upper electrode L3 are stacked on the layer of the supporting body B that constitutes the first supporting portion 4. In each of the first detection units 71*y* and 72*y* and the second detection units 71*x* and 72*x*, the interlayer insulation film M1, the upper electrode wires W, and the passivation film M2 are provided as with each of the piezoelectric cantilevers 31A, 32A, 51A to 51D, and 52A to 52D.

Further, when the first supporting portion 4 is bent and deformed by transmission of the first oscillation or the second oscillation to the first supporting portion 4, the piezoelectric body L2 of each of the first detection units 71*y* and 72*y* and the second detection units 71*x* and 72*x* outputs a voltage corresponding to a deformation amount of the bending deformation. The optical deflector 1 can detect the oscillation transmitted to the first supporting portion 4 from the voltage values at this time. In the following, the voltage output from each of the first detection units 71*y* and 72*y* is also referred to as a resonant sensor signal (analog signal).

It was found from a previously-performed experiment that, in the first supporting portion 4 of the optical deflector 1 according to the present embodiment, the center parts of the two sides parallel to the second axis X are easily bent and deformed when the mirror portion 2 is swung around the first axis Y. Accordingly, the first detection units 71*y* and 72*y* are disposed at the center parts of the corresponding two sides. Further, it was found from the previously-performed experiment that the center parts of the two sides parallel to the first axis Y are easily bent and deformed when the first supporting portion 4 is swung around the second axis X. Accordingly, the second detection units 71*x* and 72*x* are disposed at the center parts of the corresponding two sides.

The optical deflector 1 includes, on the second supporting portion 6, lower electrode pads 61*a* and 62*a*, first upper electrode pads 61*b* and 62*b*, odd-numbered-use second upper electrode pads 61*c* and 62*c*, even-numbered-use second upper electrode pads 61*d* and 62*d*, a first detection electrode pad 61*e*, and a second detection electrode pad 62*e*.

One lower electrode pad 61*a* of the lower electrode pads 61*a* and 62*a* is electrically connected to the lower electrode L1 of the one first piezoelectric cantilever 31A, the lower electrodes L1 of the one-side second piezoelectric cantilevers 51A to 51D, and the lower electrodes L1 of the first detection units 71*y* and 72*y*. The other lower electrode pad 62*a* of the lower electrode pads 61*a* and 62*a* is electrically connected to the lower electrode L1 of the other first piezoelectric cantilever 32A, the lower electrodes L1 of the other-side second piezoelectric cantilevers 52A to 52D, and the lower electrodes L1 of the second detection units 71*x* and 72*x*.

As described above, the lower electrode pads 61*a* and 62*a* serve as electrode pads common to the first piezoelectric actuators 31 and 32, the second piezoelectric actuators 51 and 52, the first detection units 71*y* and 72*y*, and the second detection units 71*x* and 72*x*.

One first upper electrode pad 61*b* of the first upper electrode pads 61*b* and 62*b* is electrically connected to the upper electrode L3 of the one first piezoelectric cantilever 31A. The other first upper electrode pad 62*b* of the first upper electrode pads 61*b* and 62*b* is electrically connected to the upper electrode L3 of the other first piezoelectric cantilever 32A.

One odd-numbered-use second upper electrode pad 61*c* of the odd-numbered-use upper electrode pads 61*c* and 62*c* is electrically connected to the upper electrodes L3 of the one-side odd-numbered second piezoelectric cantilevers 51A and 51C. The other odd-numbered-use second upper electrode pad 62*c* of the odd-numbered-use second upper electrode pads 61*c* and 62*c* is electrically connected to the upper electrodes L3 of the other-side odd-numbered second piezoelectric cantilevers 52A and 52C.

One even-numbered-use second upper electrode pad 61*d* of the even-numbered-use second upper electrode pads 61*d* and 62*d* is electrically connected to the upper electrodes L3 of the one-side even-numbered second piezoelectric cantilevers 51B and 51D. The other even-numbered-use second upper electrode pad 62*d* of the even-numbered-use second upper electrode pads 61*d* and 62*d* is electrically connected to the upper electrodes L3 of the other-side even-numbered second piezoelectric cantilevers 52B and 52D.

The first detection electrode pad 61*e* is electrically connected to the upper electrodes L3 of the first detection units 71*y* and 72*y*. The second detection electrode pad 62*e* is electrically connected to the upper electrodes L3 of the second detection units 71*x* and 72*x*.

With the above-described electric connection, in a case where the driving voltage is applied between the upper electrode L3 and the lower electrode L1, the piezoelectric body L2 stacked between the upper electrode L3 and the lower electrode L2 to which the driving voltage is applied is bent and deformed by the piezoelectric driving. As a result, the supporting body B (piezoelectric cantilever) corresponding to the bent and deformed piezoelectric body L2 is bent and deformed.

Further, as described below, in the first supporting portion 4, the voltages generated from the first detection units 71*y* and 72*y* by a piezoelectric effect derived from bending deformation caused by the transmitted oscillation are each output as a potential difference between the first detection electrode pad 61*e* and the one lower electrode pad 61*a*. Likewise, the voltages generated from the second detection units 71*x* and 72*x* by the piezoelectric effect derived from bending deformation of the first supporting portion 4 are each output as a potential difference between the second detection electrode pad 62*e* and the one lower electrode pad 61*a*.

The paired lower electrode pads 61*a* and 62*a*, and the lower electrodes L1 of the first piezoelectric cantilevers 31A and 32A, the second piezoelectric cantilevers 51A to 51D and 52A to 52D, the first detection units 71*y* and 72*y*, and the second detection units 71*x* and 72*x* are each formed through shape processing of metal thin films (two layers of metal thin films in present embodiment, hereinafter, also referred to as lower electrode layers) on a silicon substrate by using a semiconductor planar process. As materials of the metal thin films, for example, titanium (Ti), titanium dioxide (TiO2), or titanium oxide (TiOx) controlled in oxidation amount is used for a first layer (lower layer), and platinum (Pt), LaNiO3, or SrRuO3 is used for a second layer (upper layer).

In this case, the lower electrodes L1 of the first piezoelectric cantilevers 31A and 32A are formed over substantially entire surfaces on the supporting bodies B of the first piezoelectric cantilevers 31A and 32A. The lower electrodes L1 of the second piezoelectric cantilevers 51A to 51D and 52A to 52D are formed over substantially entire surfaces on the supporting bodies B of the second piezoelectric cantilevers 51A to 51D and 52A to 52D (entire portion including linear portion and coupling portion of each piezoelectric cantilever).

The lower electrodes L1 of the first detection units 71*y* and 72*y* are formed on portions where the first detection units 71*y* and 72*y* are disposed, on the supporting body B of the first supporting portion 4. The lower electrodes L1 of the second detection units 71*x* and 72*x* are formed on portions where the second detection units 71*x* and 72*x* are disposed, on the supporting body B of the first supporting portion 4. Likewise, the lower electrode L1, the interlayer insulation film M1, the upper electrode wires W, and the passivation film M2 are also provided on the second supporting portion 6.

The lower electrode pads 61*a* and 62*a* are conducted to the lower electrodes L1 of the first piezoelectric cantilevers 31A and 32A, the lower electrodes L1 of the second piezoelectric cantilevers 51A to 51D and 52A to 52D, the lower electrodes L1 of the first detection units 71*y* and 72*y*, and the lower electrodes L1 of the second detection units 71*x* and 72*x* through the lower electrodes L1 formed on the second supporting portion 6 and on the first supporting portion 4 in the above-described manner.

The piezoelectric bodies L2 of the first piezoelectric cantilevers 31A and 32A, the second piezoelectric cantilevers 51A to 51D and 52A to 52D, the first detection units 71*y* and 72*y*, and the second detection units 71*x* and 72*x* are formed separately from one another on the lower electrodes L1 of the respective piezoelectric cantilevers through shape processing of piezoelectric films (hereinafter, also referred to as piezoelectric body layers) on the lower electrode layers by using a semiconductor planar process. As a material of the piezoelectric films, for example, lead titanate zirconate (PZT) as a piezoelectric material is used.

In this case, the piezoelectric bodies L2 of the first piezoelectric cantilevers 31A and 32A are formed over substantially entire surfaces of the lower electrodes L1 of the first piezoelectric cantilevers 31A and 32A. The piezoelectric bodies L2 of the second piezoelectric cantilevers 51A to 51D and 52A to 52D are formed over substantially entire surfaces on the lower electrodes L1 in extending portions (linear portions) of the second piezoelectric cantilevers 51A to 51D and 52A to 52D. The piezoelectric bodies L2 of the first detection units 71*y* and 72*y* are formed over substantially entire surfaces on the lower electrodes L1 of the first detection units 71*y* and 72*y*. The piezoelectric bodies L2 of the second detection units 71*x* and 72*x* are formed over substantially entire surfaces on the lower electrodes L1 of the second detection units 71*x* and 72*x*.

"The first upper electrode pads 61*b* and 62*b*, the odd-numbered-use second upper electrode pads 61*c* and 62*c*, the even-numbered-use second upper electrode pads 61*d* and 62*d*, the first detection electrode pad 61*e*, and the second detection electrode pad 62*e*", "the upper electrodes L3 of the first piezoelectric cantilevers 31A and 32A, the second piezoelectric cantilevers 51A to 51D and 52A to 52D, the first detection units 71*y* and 72*y*, and the second detection units 71*x* and 72*x*", and the upper electrode wires W conducting these components are each formed through shape processing of a metal thin film (one layer of metal thin film in present embodiment, hereinafter, also referred to as upper electrode layer) on the piezoelectric body layer by using a semiconductor planar process. As a material of the metal thin film, for example, platinum (Pt), gold (Au), aluminum (Al), or an aluminum alloy (Al alloy) is used.

In this case, the upper electrodes L3 of the first piezoelectric cantilevers 31A and 32A, the second piezoelectric cantilevers 51A to 51D and 52A to 52D, the first detection units 71*y* and 72*y*, and the second detection units 71*x* and 72*x* are formed over substantially entire surfaces of the piezoelectric bodies L2 of the piezoelectric cantilevers and the detection units.

Further, the first upper electrode pads 61*b* and 62*b* are respectively conducted to the upper electrodes L3 of the first piezoelectric cantilevers 31A and 32A through the first driving upper electrode wires Wy in the above-described manner. Further, the odd-numbered-use second upper electrode pads 61*c* and 62*c* are conducted to the upper electrodes L3 of the odd-numbered second piezoelectric cantilevers 51A, 51C, 52A, and 52C through the second driving odd-numbered-use upper electrode wires Wo in the above-described manner. Further, the even-numbered-use second upper electrode pads 61*d* and 62*d* are conducted to the upper electrodes L3 of the even-numbered second piezoelectric cantilevers 51B, 51D, 52B, and 52D through the second driving even-numbered-use upper electrode wires We in the above-described manner.

The first detection electrode pad 61*e* is conducted to the upper electrodes L3 of the first detection units 71*y* and 72*y* through the first detection upper electrode wires Wmy in the above-described manner. Further, the second detection electrode pad 62*e* is conducted to the upper electrodes L3 of the second detection units 71*x* and 72*x* through the second detection upper electrode wires Wmx in the above-described manner.

As illustrated in FIG. 3A and FIG. 3B, the first driving upper electrode wires Wy, the second driving odd-numbered-use upper electrode wires Wo, the second driving even-numbered-use upper electrode wires We, the first detection upper electrode wires Wmy, and the second detection upper electrode wires Wmx are provided separately from one another in a plane. Each upper electrode wire W is insulated by the interlayer insulation film M1 formed between the upper electrode wire W and the upper electrode L3. To conduct the upper electrode wire W to the upper electrode L3, a conductive member (for example, electrode via) is formed in the interlayer insulation film M1 so as to conduct the upper electrode wire W and the upper electrode L3.

Each passivation film M2 is formed on the corresponding upper electrode wires W by using a semiconductor planar process so as to surround the upper electrode wires W.

The reflection surface supporting body 2*b*, the torsion bars 21 and 22, the supporting body B, the first supporting portion 4, and the second supporting portion 6 are integrally formed through shape processing of a semiconductor substrate (silicon substrate) including a plurality of layers. As a method of performing shape processing of the semiconductor substrate, a semiconductor planar process and a MEMS process using a photolithography technique, a dry etching technique, or the like.

Next, operation of the optical deflector 1 according to the present embodiment is described. First, a case where the first piezoelectric actuators 31 and 32 swing the mirror portion 2 around the first axis Y relative to the first supporting portion 4 is described.

In this case, the optical deflector 1 applies the driving voltages to the first piezoelectric actuators 31 and 32. More specifically, in the one first piezoelectric actuator 31, a first driving voltage Vy1 is applied between the one first upper electrode 61*b* and one lower electrode pad 61*a* to drive the one piezoelectric cantilever 31A. In the other first piezoelectric actuator 32, a second driving voltage Vy2 is applied between the other first upper electrode pad 62*b* and the other lower electrode pad 62*a* to drive the other first piezoelectric cantilever 32A. The first driving voltage Vy1 and the second driving voltage Vy2 are alternating-current voltages (for example, sine waves or sawtooth waves) opposite or shifted in phase from each other. In the following, each of the first driving voltage Vy1 and the second driving voltage Vy2 is also referred to as a resonant driving signal (analog signal).

At this time, swing voltage components of the first driving voltage Vy1 and the second driving voltage Vy2 are applied such that, in a vertical direction (upward direction U and downward direction opposite thereto in FIG. 2) of the first piezoelectric actuators 31 and 32, angular displacement of the one first piezoelectric cantilever 31A and angular displacement the other first piezoelectric cantilever 32A are generated in opposite directions.

For example, to displace front end parts of the one first piezoelectric actuator 31 in the upward direction when the mirror portion 2 is swung around the first axis Y, the one first piezoelectric cantilever 31A is displaced in the upward direction. To displace the front end parts of the one first piezoelectric actuator 31 in the downward direction, the one first piezoelectric cantilever 31A is displaced in the downward direction.

As with the one first piezoelectric actuator 31, to displace front end parts of the other first piezoelectric actuator 32 in the upward direction, the other first piezoelectric cantilever 32A is displaced in the upward direction. To displace the front end parts of the other first piezoelectric actuator 32 in the downward direction, the other first piezoelectric cantilever 32A is displaced in the downward direction.

In the optical deflector 1 according to the present embodiment, when the mirror portion 2 is swung around the first axis Y, a large deflection angle is obtained by "displacing the front end parts of the one first piezoelectric actuator 31 in the upward direction and displacing the front end parts of the other first piezoelectric actuator 32 in the downward direction" or "displacing the front end parts of the one first piezoelectric actuator 31 in the downward direction and displacing the front end parts of the other first piezoelectric actuator 32 in the upward direction". As described above, in the present embodiment, the mirror portion 2 can be swung around the first axis Y, and optical scanning at a predetermined first deflection angle can be performed at a predetermined first frequency Fy.

Next, a case where the second piezoelectric actuators 51 and 52 swing the first supporting portion 4 around the second axis X relative to the second supporting portion 6 is described.

In this case, the optical deflector 1 applies the driving voltages to the second piezoelectric actuators 51 and 52. More specifically, in the one second piezoelectric actuator 51, a third driving voltage Vx1 is applied between one odd-numbered-use second upper electrode pad 61*c* and the one lower electrode pad 61*a* to drive the one-side odd-numbered second piezoelectric cantilevers 51A and 51C. In addition, in the one second piezoelectric actuator 51, a fourth driving voltage Vx2 is applied between the one even-numbered-use second upper electrode pad 61*d* and the one lower electrode pad 61*a* to drive the one-side even-numbered second piezoelectric cantilevers 51B and 51D.

Further, in the other second piezoelectric actuator 52, the third driving voltage Vx1 is applied between the other odd-numbered-use second upper electrode pad 62*c* and the other lower electrode pad 62*a* to drive the other-side odd-numbered second piezoelectric cantilevers 52A and 52C. In addition, in the other second piezoelectric actuator 52, the fourth driving voltage Vx2 is applied between the other even-numbered-use second upper electrode pad 62*d* and the other lower electrode pad 62*a* to drive the other-side even-numbered second piezoelectric cantilevers 52B and 52D.

The third driving voltage Vx1 and the fourth driving voltage Vx2 are alternating-current voltages (for example, sine waves or sawtooth waves) opposite in phase to each other. The third driving voltage Vx1 and the fourth driving voltage Vx2 may be alternating-current voltages (for example, sine waves or sawtooth waves) shifted in phase from each other. In the following, each of the third driving voltage Vx1 and the fourth driving voltage Vx2 is also referred to as non-resonant driving signal (analog signal). An angle of view and a deflection direction of the picture projected by the picture projection apparatus 10 can be changed by changing an amplitude and an offset amount of the non-resonant driving signal. This makes it possible to control a swing angle and an offset angle.

At this time, swing voltage components of the third driving voltage Vx1 and the fourth driving voltage Vx2 are set such that, in a vertical direction (upward direction U and downward direction opposite thereto in FIG. 2) of the second piezoelectric actuators 51 and 52, angular displacement of the odd-numbered second piezoelectric cantilevers 51A, 51C, 52A, and 52C and angular displacement of the even-numbered second piezoelectric cantilevers 51B, 51D, 52B, and 52D are generated in opposite directions.

For example, to displace front end parts of the second piezoelectric actuators 51 and 52 in the upward direction (direction U illustrated in FIG. 2) when the first supporting portion 4 is swung around the second axis X, the odd-numbered second piezoelectric cantilevers 51A, 51C, 52A, and 52C are displaced in the upward direction, and the even-numbered second piezoelectric cantilevers 51B, 51D, 52B, and 52D are displaced in the downward direction. To displace the front end parts of the second piezoelectric actuators 51 and 52 in the downward direction, the odd-numbered second piezoelectric cantilevers 51A, 51C, 52A, and 52C are displaced in the downward direction, and the even-numbered second piezoelectric cantilevers 51B, 51D, 52B, and 52D are displaced in the upward direction.

As a result, the odd-numbered second piezoelectric cantilevers 51A, 51C, 52A, and 52C and the even-numbered second piezoelectric cantilevers 51B, 511D, 52B, and 52D are bent and deformed in opposite directions.

Figure 4A:
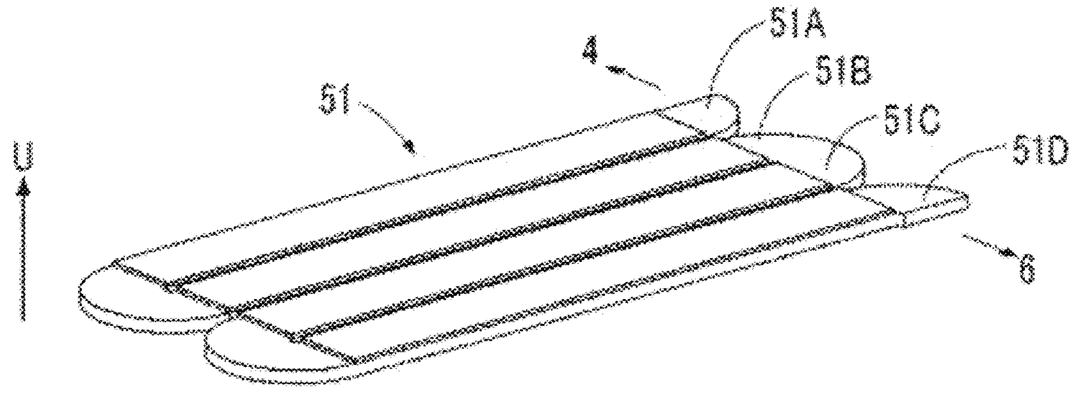
FIG. 4A is a diagram illustrating a state where a piezoelectric actuator of the optical deflector does not operate.
Figure 4B:
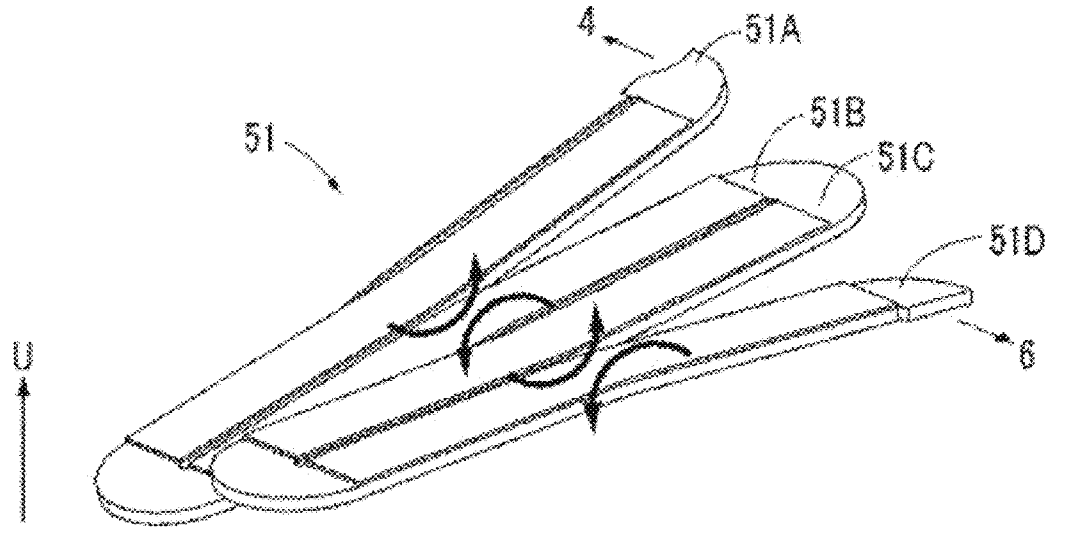
FIG. 4B is a diagram illustrating a state where the piezoelectric actuator operates.

FIG. 4A and FIG. 4B are diagrams illustrating operation of the one second piezoelectric actuator 51 of the optical deflector 1. FIG. 4A illustrates a state where the one second piezoelectric actuator 51 does not operate, and FIG. 4B illustrates a state where the one second piezoelectric actuator 51 operates.

As illustrated in FIG. 4B, in a fourth one second piezoelectric cantilever 511D, angular displacement in the downward direction is generated at a front end part with a base end part coupled to the second supporting portion 6 as a fulcrum. In a third one second piezoelectric cantilever 51C, angular displacement in the upward direction is generated at a front end part with a base end part coupled to the front end part of the fourth one second piezoelectric cantilever 51D as a fulcrum.

In a second one second piezoelectric cantilever 51B, angular displacement in the downward direction is generated at a front end part with a base end part coupled to the front end part of the third one second piezoelectric cantilever 51C as a fulcrum. In the first one second piezoelectric cantilever 51A, angular displacement in the upward direction is generated at a front end part with a base end part coupled to the front end part of the second one second piezoelectric cantilever 51B as a fulcrum. As a result, in the one second piezoelectric actuator 51, angular displacement of magnitude obtained by adding magnitudes of bending deformation of the one-side second piezoelectric cantilevers 51A to 51D is generated.

As a result, the first supporting portion 4 can be swung around the second axis X, and optical scanning at a predetermined second deflection angle can be performed at a predetermined second frequency Fx. At this time, in these second piezoelectric actuators 51 and 52, the alternating-current voltages of a frequency near a mechanical resonance frequency of the first supporting portion 4 including the second piezoelectric actuators 51 and 52 are applied as the driving voltages to cause resonance driving, which makes it possible to perform the optical scanning at a larger deflection angle.

Further, in the case where the first supporting portion 4 is swung around the second axis X, it is unnecessary to apply the alternating-current voltages as described above, and direct-current voltages may be applied. In this case, the magnitude of bending deformation generated in the second piezoelectric cantilevers 51A to 51D and 52A to 52D is linearly changed based on the magnitudes of the direct-current voltages. Accordingly, for example, unlike the case where the alternating-current voltages are applied to perform resonance driving of the piezoelectric cantilevers, optional outputs can be obtained from the second piezoelectric actuators 51 and 52 by controlling the magnitudes of the direct-current voltages.

As described above, in the case where the first supporting portion 4 is swung around the second axis X, the optical deflector 1 can linearly control the deflection angle based on the magnitudes of the direct-current voltages applied as the driving voltages. This makes it possible to obtain the optional deflection angle at an optional speed.

Further, each of the second piezoelectric actuators 51 and 52 is formed in a meander shape (or in bellows shape). Accordingly, bending deformation of each piezoelectric cantilever is accumulated. Thus, the second piezoelectric actuators 51 and 52 easily obtain the large deflection angle as compared with the first piezoelectric actuators 31 and 32.

Therefore, in the present embodiment, in the case where the mirror portion 2 is swung by the first piezoelectric actuators 31 and 32, the frequency changing displacement of the first piezoelectric actuators 31 and 32 in the upward direction or the downward direction, namely, the first frequency Fy is set to a resonance frequency determined based on a structure, a material, and the like of the optical deflector 1 (in particular, piezoelectric cantilevers and the like) in order to obtain a deflection angle as large as possible.

Further, the second piezoelectric actuators 51 and 52 are each formed in a meander shape (or in bellows shape), and easily swing the first supporting portion 4 as compared with the first piezoelectric actuators 31 and 32. Accordingly, the second frequency Fx is set to be sufficiently lower than the first frequency Fy. In the present embodiment, for example, the first frequency Fy is set to 30 kHz, and the second frequency Fx is set to 60 Hz.

Figure 5:
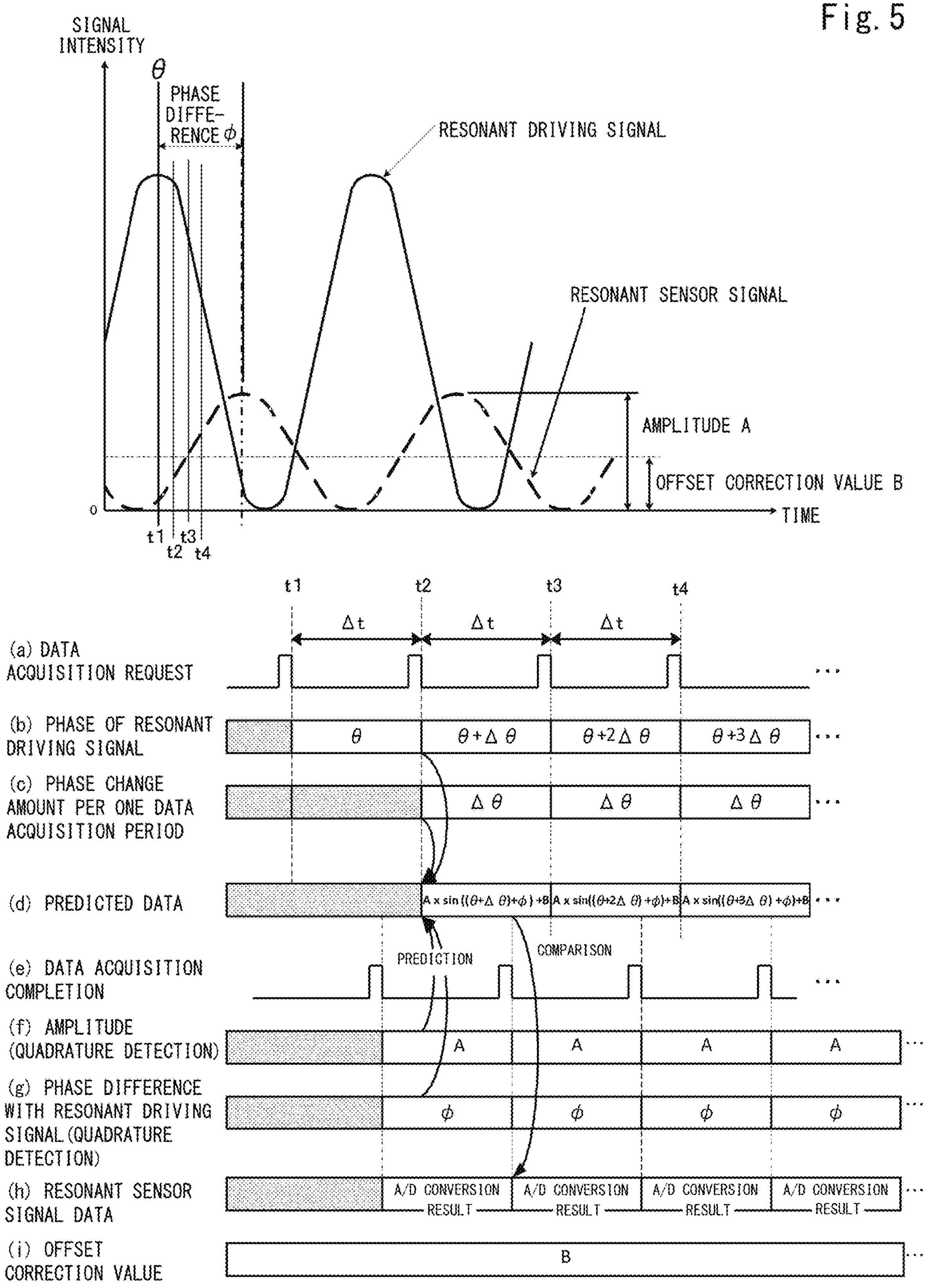

FIG. 5 illustrates examples of the resonant driving signal applied to the optical deflector 1 (first piezoelectric actuators 31 and 32), the resonant sensor signal output from the optical deflector 1 (first detection units 71*y* and 72*y*), and the like.

When the resonant driving signal (see FIG. 5) is applied to the optical deflector 1 (first piezoelectric actuators 31 and 32), the MEMS mirror (mirror portion 2) is swung around a vertical axis. The resonant sensor signal (see FIG. 5) in response to the swinging (swing angle) of the MEMS mirror (mirror portion 2) is output from the optical deflector 1 (first detection units 71*y* and 72*y*).

Figure 6:
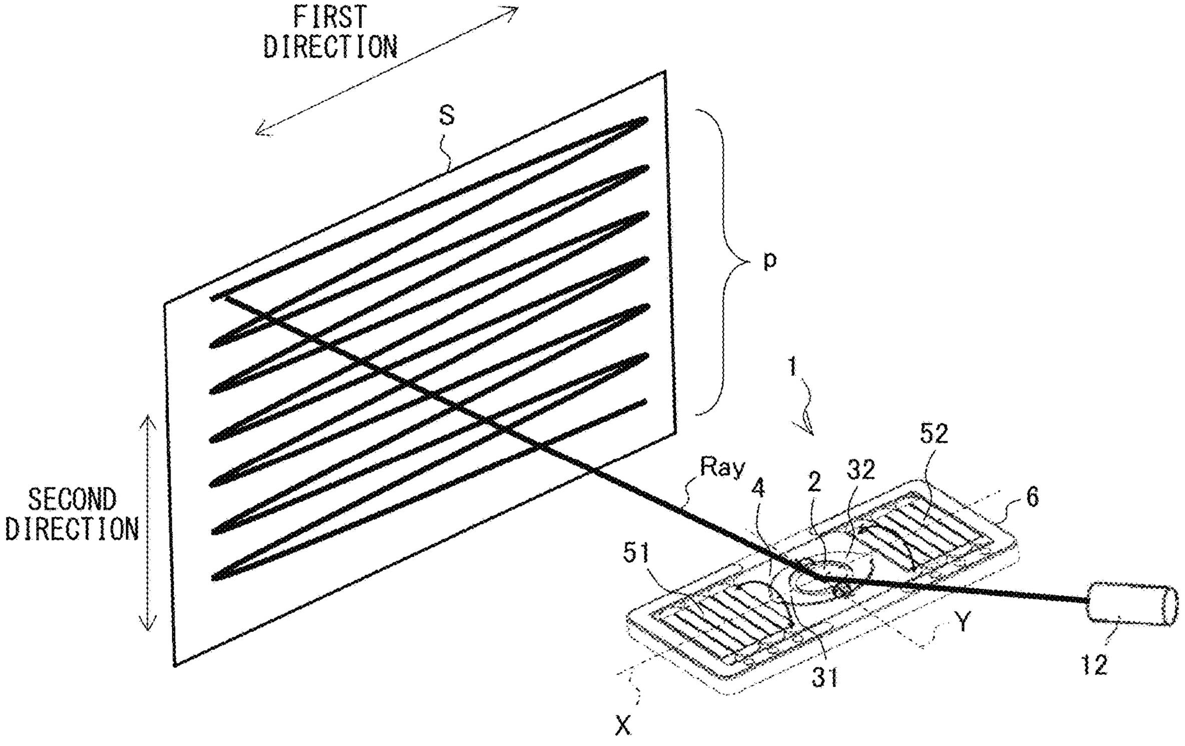
FIG. 6 is a diagram illustrating a state where a picture p is drawn on a screen S with a laser beam Ray scanned (raster-scanned) by the optical deflector 1.

FIG. 6 is a diagram illustrating a state where the picture p is drawn on the screen S with the laser beam Ray scanned (raster-scanned) by the optical deflector 1.

As described above, when the mirror portion 2 is swung around the first axis Y relative to the first supporting portion 4, scanning with the laser beam Ray entering the mirror portion 2 from the semiconductor light source 12 is performed in a first direction (for example, horizontal direction) as illustrated in FIG. 6.

Further, when the mirror portion 2 is swung around the second axis X relative to the second supporting portion 6, scanning with the laser beam Ray entering the mirror portion 2 from the semiconductor light source 12 is performed in a second direction (for example, vertical direction) as illustrated in FIG. 6.

As described above, the picture p is drawn (projected) on the screen S with the laser beam Ray scanned by the optical deflector 1.

Next, the control apparatus 20 is described.

As illustrated in FIG. 1, the control apparatus 20 includes a system control unit 130, a light source driving unit 40, a resonant sensor signal processing unit 50, a resonant driving signal generation unit 60, and a non-resonant driving signal generation unit 70.

The light source driving unit 40 converts (D/A-converts) image data transmitted from the system control unit 130 into a driving signal (analog signal) for driving the light source, and applies the converted driving signal to the semiconductor light source 12. As a result, the semiconductor light source 12 emits light based on a control signal applied from the light source driving unit 40.

The resonant driving signal generation unit 60 mainly includes a D/A converter and an operation amplifier (amplifier) amplifying an output of the D/A converter to a driving voltage level of the MEMS mirror (mirror portion 2). In the following, as for the resonant driving signal generation unit 60, functions of the D/A converter are mainly described for convenience. The resonant driving signal generation unit 60 converts (D/A-converts) resonant driving signal data (digital signal) output from the system control unit 130 into the resonant driving signal (analog signal), and applies the converted resonant driving signal (see FIG. 5) to the optical deflector 1 (first piezoelectric actuators 31 and 32). As a result, the MEMS mirror (mirror portion 2) is swung around the vertical axis. In response to the swinging (swing angle) of the MEMS mirror (mirror portion 2), the optical deflector 1 (first detection units 71*y* and 72*y*) outputs the resonant sensor signal (see FIG. 5).

The resonant sensor signal processing unit 50 mainly includes an A/D converter and an operation amplifier (amplifier) for amplification to an input level suitable for the A/D converter. In the following, as for the resonant sensor signal processing unit 50, functions of the A/D converter are mainly described for convenience. In the following, the resonant sensor signal processing unit 50 is referred to as the A/D converter 50. The A/D converter 50 includes a function of A/D-converting the resonant sensor signal output from the optical deflector 1 (first detection units 71*y* and 72*y*) into the resonant sensor signal data (see FIG. 5(*h*)) every time receiving a data acquisition request (see FIG. 5(*a*)) output from the system control unit 130, and a function of outputting a data acquisition completion (see FIG. 5(*e*)) and the A/D-converted resonant sensor signal data (see FIG. 5(*h*)) every time the A/D conversion is completed.

FIG. 5(*a*) illustrates an example of the data acquisition request output from the system control unit 130. The system control unit 130 outputs the data acquisition request (see FIG. 1). The A/D converter 50 detects rising of the data acquisition request output from the system control unit 130, and starts A/D conversion operation.

FIG. 5(*h*) illustrates an example of the resonant sensor signal data (A/D conversion result) output from the A/D converter 50. In FIG. 5(*h*), a first A/D conversion result (at left end) indicates the resonant sensor signal data A/D-converted in response to the data acquisition request (see FIG. 5(*a*)) output at time t1. A next A/D conversion result indicates the resonant sensor signal data A/D-converted in response to the data acquisition request (see FIG. 5(*a*)) output at time t2. Subsequent A/D conversion results similarly indicate the resonant sensor signal data. FIG. 5(*e*) illustrates an example of the data acquisition completion output from the A/D converter 50. After the A/D conversion is completed, the A/D converter 50 outputs the data acquisition completion to the system control unit 130 (see FIG. 1). The system control unit 130 detects rising of the data acquisition completion output from the A/D converter 50, and holds the A/D-converted data output from the A/D converter 50, as the resonant sensor signal data.

Next, an operation example of the A/D converter 50 is described.

Figure 10:
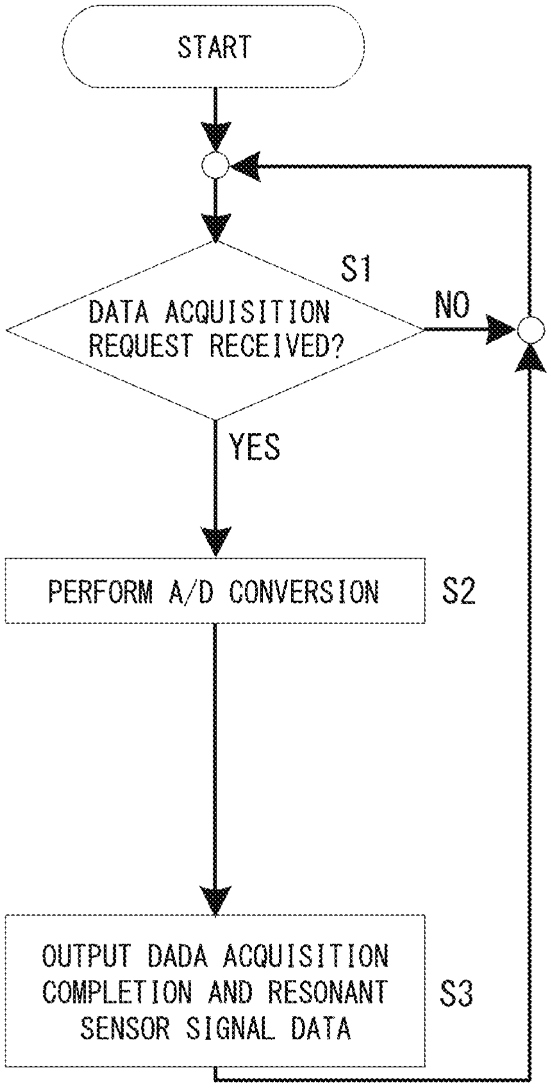
FIG. 10 is a flowchart of an operation example of an A/D converter 50.

FIG. 10 is a flowchart of the operation example of the A/D converter 50.

As illustrated in FIG. 10, when receiving the data acquisition request (see FIG. 5(*a*)) output from the system control unit 130 (step S1: YES), the A/D converter 50 A/D-converts the resonant sensor signal output from the optical deflector 1 (first detection units 71*y* and 72*y*) into the resonant sensor signal data (see FIG. 5(*h*)) (step S2).

After the A/D conversion is completed, the A/D converter 50 outputs the data acquisition completion (see FIG. 5(*e*)) to the system control unit 130 (step S3). The system control unit 130 detects rising of the data acquisition completion, and holds the A/D-converted data output from the converter 50, as the resonant sensor signal data.

The non-resonant driving signal generation unit 70 is a D/A converter. The non-resonant driving signal generation unit 70 converts (D/A-converts) non-resonant driving signal data (digital signal) output from the system control unit 130 into a non-resonant driving signal (analog signal), and applies the converted non-resonant driving signal to the optical deflector 1 (second piezoelectric actuators 51 and 52). As a result, the MEMS mirror (mirror portion 2) is swung around a horizontal axis.

Next, the system control unit 130 is described.

Figure 7:
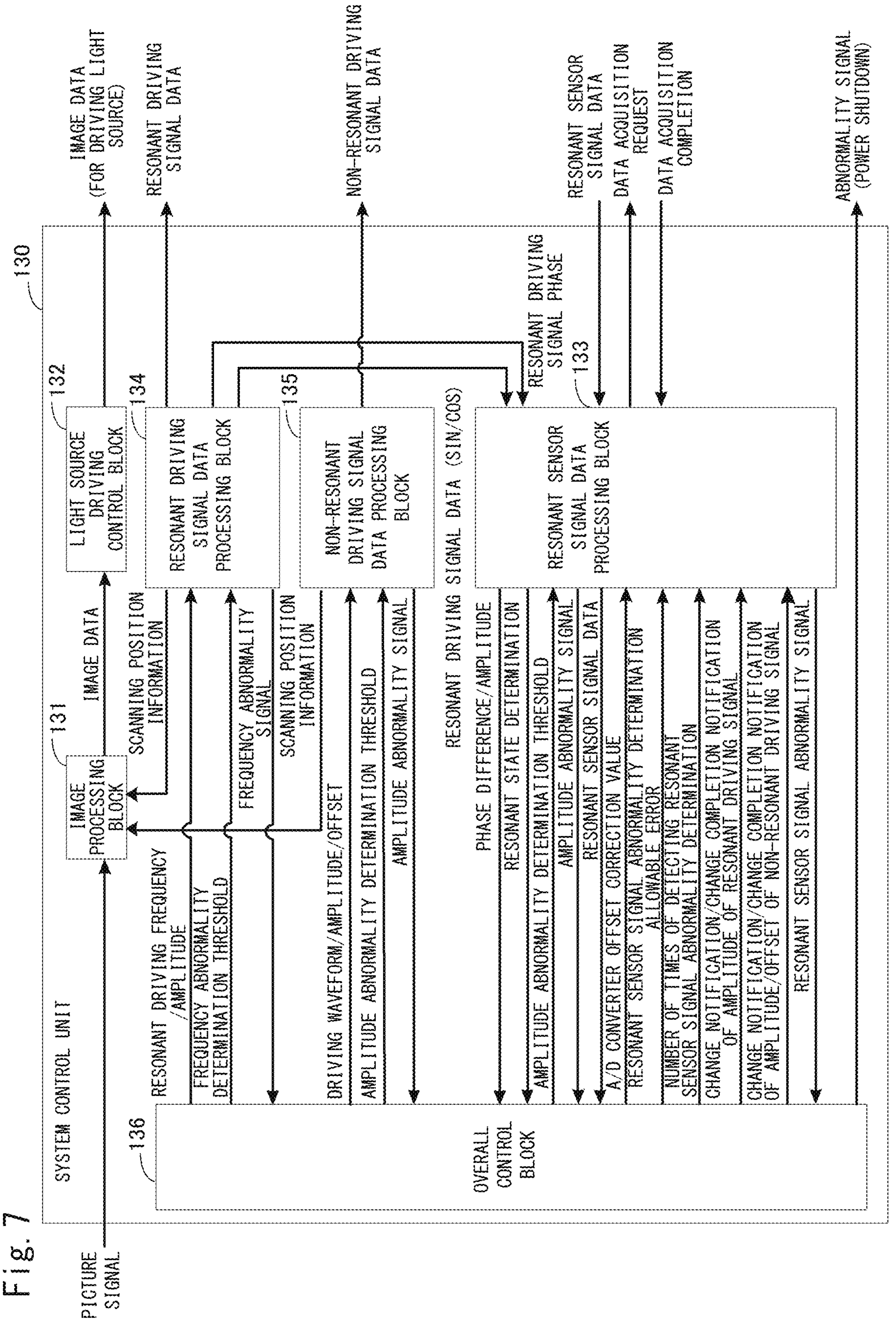
FIG. 7 is a configuration diagram of a system control unit 130.

FIG. 7 is a configuration diagram of the system control unit 130.

As illustrated in FIG. 7, the system control unit 130 includes an overall control block 136, an image processing block 131, a light source driving control block 132, a resonant sensor signal data processing block 133, a resonant driving signal data processing block 134, and a non-resonant driving signal data processing block 135.

Figure 8:
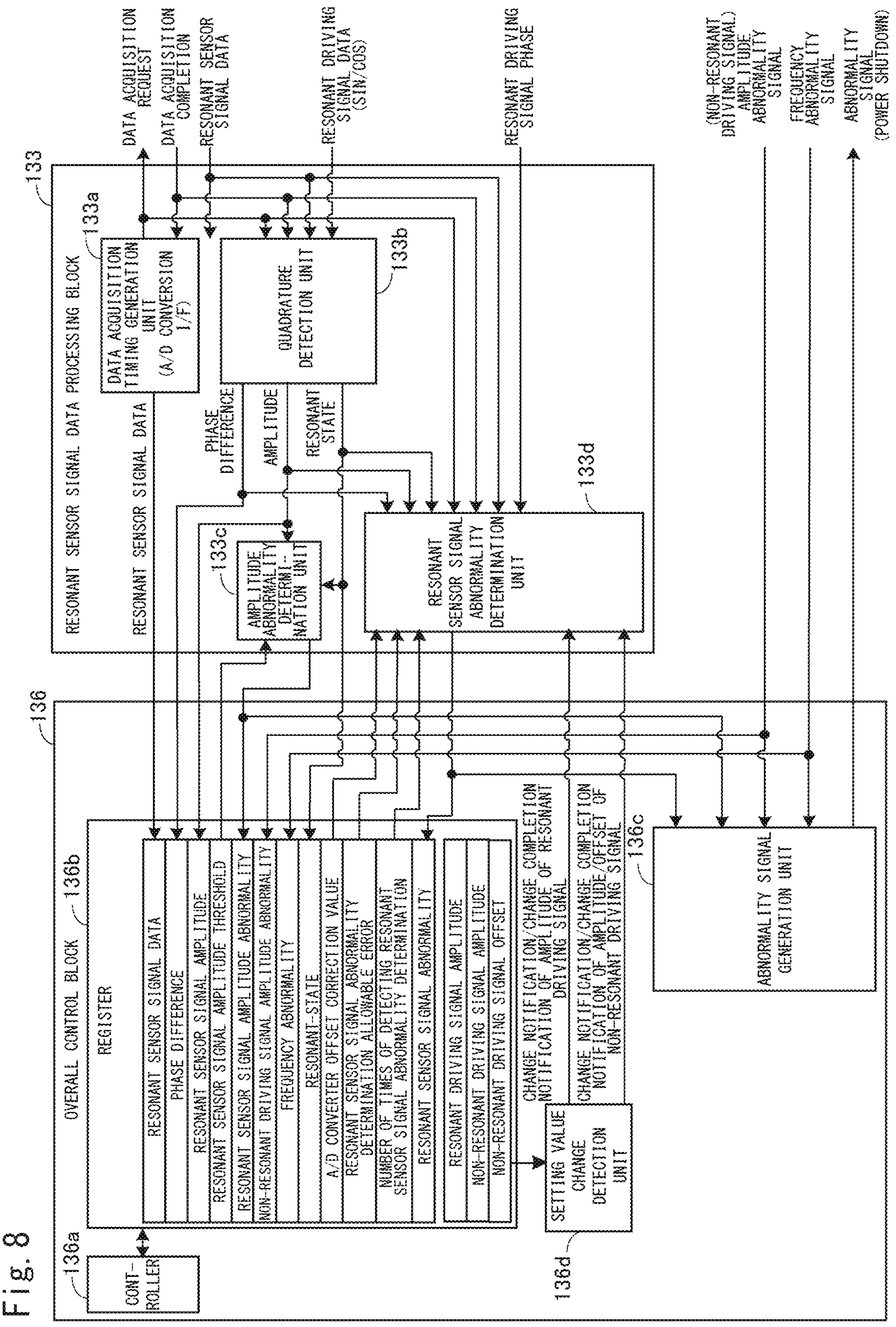
FIG. 8 is a configuration diagram of an overall control block 136 and a resonant sensor signal data processing block 133.

FIG. 8 is a configuration diagram of the overall control block 136 and the resonant sensor signal data processing block 133.

As illustrated in FIG. 8, the overall control block 136 includes a controller 136*a*, a register 136*b*, an abnormality signal generation unit 136*c*, and a setting value change detection unit 136*d*.

The controller 136*a* is a logic circuit such as an FPGA, or a CPU having a function of the controller.

The register 136*b* receives control signals and abnormality signals from the other control blocks and holds values. The register 136*b* also holds parameters and the like used by the other control blocks.

In a case where the abnormality signal generation unit 136*c* receives a resonant sensor signal abnormality signal output from a resonant sensor signal abnormality determination unit 133*d*, the abnormality signal generation unit 136*c* generates and outputs an abnormality signal for power shutdown.

In a case where an amplitude of the resonant driving signal, or an amplitude/offset of the non-resonant driving signal is changed, the setting value change detection unit 136*d* generates and outputs a change notification/change completion notification of the amplitude of the resonant driving signal, or a change notification/change completion notification of the amplitude/offset of the non-resonant driving signal.

The image processing block 131 generates image data based on a picture signal input from outside of the system (for example, information processing apparatus such as personal computer), and scanning position information on the MEMS mirror (mirror portion 2).

The light source driving control block 132 performs I/F control (for example, operation timing conversion and data conversion) for outputting the image data generated by the image processing block 131 to the light source driving unit 40.

The resonant sensor signal data processing block 133 performs I/F control (for example, data acquisition request) for acquiring the resonant sensor signal data.

As illustrated in FIG. 8, the resonant sensor signal data processing block 133 includes a data acquisition timing generation unit 133*a*, a quadrature detection unit 133*b*, an amplitude abnormality determination unit 133*c*, and the resonant sensor signal abnormality determination unit 133*d*.

The data acquisition timing generation unit 133*a* is an A/D conversion I/F. The data acquisition timing generation unit 133*a* performs I/F control (A/D conversion request and data acquisition) for acquiring the resonant sensor data.

For example, the data acquisition timing generation unit 133*a* outputs the data acquisition request (see FIG. 5(*a*)) at each prescribed period (time Δt).

Every time receiving the data acquisition completion (see FIG. 5(*e*)) output from the A/D converter 50 and the A/D-converted resonant sensor signal data (see FIG. 5(*h*)), the data acquisition timing generation unit 133*a* stores the received resonant sensor signal data in the register 136*b* of the overall control block 136.

The quadrature detection unit 133*b* performs quadrature detection based on the resonant sensor signal data output from the A/D converter 50 and the resonant driving signal data (SIN/COS) output from the resonant driving signal data processing block 134, thereby acquiring an amplitude A of the resonant sensor signal and a phase difference φ between the resonant driving signal and the resonant sensor signal. For example, the amplitude A and the phase difference φ are acquired by performing convolutional integration based on the resonant sensor signal data (A/D conversion result, see FIG. 5(*h*)) output in response to the data acquisition request (see FIG. 5(*a*)) and the resonant driving signal data (SIN/COS) corresponding to the phase of the resonant driving signal at that time.

FIG. 5(*f*) illustrates an example of the amplitude A of the resonant sensor signal acquired by the quadrature detection unit 133*b*. In FIG. 5(*f*), a first amplitude A (at left end) indicates the amplitude of the resonant sensor signal acquired by the quadrature detection unit 133*b* in response to the data acquisition request (see FIG. 5(*a*)) output at time t1. A next amplitude A indicates the amplitude of the resonant sensor signal acquired by the quadrature detection unit 133*b* in response to the data acquisition request (see FIG. 5(*a*)) output at time t2. Subsequent amplitudes A similarly indicate the amplitudes of the resonant sensor signal.

FIG. 5(*g*) illustrates an example of the phase difference φ between the resonant driving signal and the resonant sensor signal, acquired by the quadrature detection unit 133*b*. In FIG. 5(*g*), a first phase difference φ (at left end) indicates the phase difference acquired by the quadrature detection unit 133*b* in response to the data acquisition request (see FIG. 5(*a*)) output at time t1. A next phase difference φ indicates the phase difference acquired by the quadrature detection unit 133*b* in response to the data acquisition request (see FIG. 5(*a*)) output at time t2. Subsequent phase differences p similarly indicate the phase differences.

Further, the quadrature detection unit 133*b* determines a resonant state of the MEMS mirror (mirror portion 2). The resonant state of the MEMS mirror (mirror portion 2) can be determined by determining, for example, stability from change in amplitude value of the resonant sensor signal calculated by quadrature detection and an elapsed time. The determined resonant state of the MEMS mirror (mirror portion 2) is stored in the register 136*b* of the overall control block 136.

In a case where the amplitude A of the resonant sensor signal is less than an assumed certain value, the amplitude abnormality determination unit 133*c* detects abnormality, and outputs a resonant sensor signal amplitude abnormality signal. The certain value is determined based on characteristics of the device. The value is set in the register 136*b* (resonant sensor signal amplitude threshold) in the overall control block 136. However, when the amplitude exceeds the value, abnormality cannot be detected. Abnormality determination is to be performed in a state where the resonant drive is stable (resonant state). The resonant state is determined by determining stability from change in amplitude A of the resonant sensor signal calculated by quadrature detection and the elapsed time.

Next, the resonant sensor signal abnormality determination unit 133*d* is described.

Figure 9:
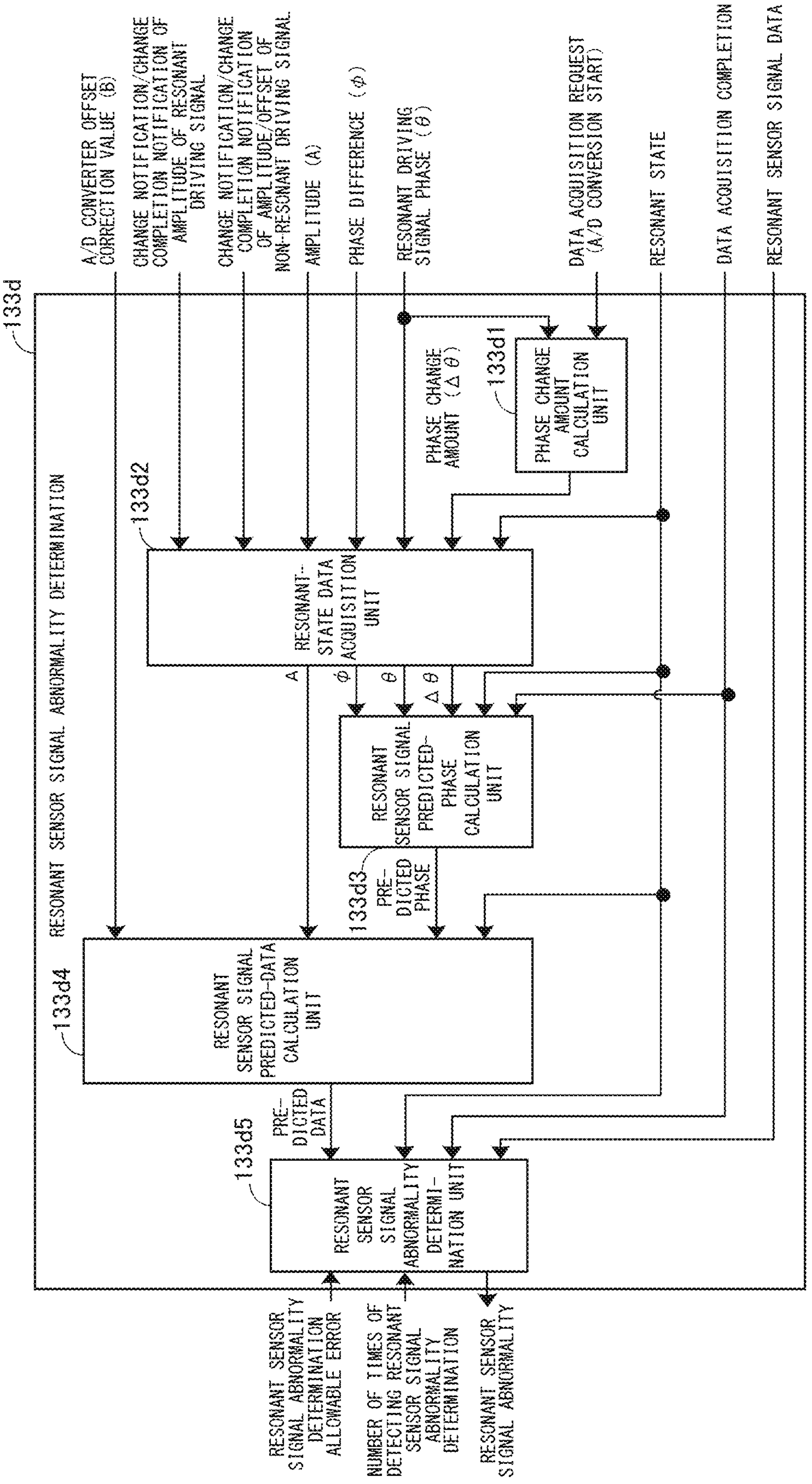
FIG. 9 is a configuration diagram of a resonant sensor signal abnormality determination unit 133*d;*

FIG. 9 is a configuration diagram of the resonant sensor signal abnormality determination unit 133*d*.

As illustrated in FIG. 9, the resonant sensor signal abnormality determination unit 133*d* includes a phase change amount calculation unit 133*d*1, a resonant state data acquisition unit 133*d*2, a resonant sensor signal predicted-phase calculation unit 133*d*3, a resonant sensor signal predicted-data calculation unit 133*d*4, and a resonant sensor signal abnormality determination unit 133*d*5.

The abnormality detection apparatus 100 is mainly configured by the data acquisition timing generation unit 133*a*, the phase change amount calculation unit 133*d*1, the resonant sensor signal predicted-phase calculation unit 133*d*3, the resonant sensor signal predicted-data calculation unit 133*d*4, the resonant sensor signal abnormality determination unit 133*d*5, and the resonant sensor signal processing unit 50.

The phase change amount calculation unit 133*d*1 calculates a phase change amount (phase change amount per one data acquisition period) that is a difference between a phase (current phase) of the resonant driving signal applied to the optical deflector 1 (first piezoelectric actuators 31 and 32)

and a phase (previous phase) of the resonant driving signal previously applied to the optical deflector 1 (first piezoelectric actuators 31 and 32).

FIG. 5(*b*) illustrates an example of the phase of the resonant driving signal. In FIG. 5(*b*), a first phase θ (at left end) indicates the phase acquired in response to the data acquisition request (see FIG. 5(*a*)) output at time t1. A next phase θ+Δθ indicates the phase acquired in response to the data acquisition request (see FIG. 5(*a*)) output at time t2. Subsequent phases θ+2Δθ and the like similarly indicate the phases.

FIG. 5(*c*) illustrates an example of the phase change amount (phase change amount per one data acquisition period). In FIG. 5(*c*), a first phase change amount Δθ (at left end) indicates the phase change amount calculated in response to the data acquisition request (see FIG. 5(*a*)) output at time t1. A next phase change amount Δθ indicates the phase change amount calculated in response to the data acquisition request (see FIG. 5(*a*)) output at time t2. Subsequent phase change amounts Δθ similarly indicate the phase change amounts.

In a case where the MEMS mirror (mirror portion 2) is in the resonant state (transition is made to resonant state), the resonant state data acquisition unit 133*d*2 acquires and holds the amplitude A of the resonant sensor signal and the phase difference φ between the resonant driving signal and the resonant sensor signal output from the phase change amount calculation unit 133*d*1, the phase θ of the resonant driving signal output from the resonant driving signal data processing block 134, and the phase change amount output from the phase change amount calculation unit 133*d*1. It can be determined whether the MEMS mirror (mirror portion 2) is in the resonant state by referring to the register 136*b* (resonant state) of the overall control block 136.

In a case where the setting value change detection unit 136*d* of the overall control block 136 outputs the change notification/change completion notification of the amplitude of the resonant driving signal, or the change notification/change completion notification of the amplitude/offset of the non-resonant driving signal, the resonant state data acquisition unit 133*d*2 again acquires and holds the amplitude A of the resonant sensor signal and the phase difference φ between the resonant driving signal and the resonant sensor signal output from the phase change amount calculation unit 133*d*1, the phase θ of the resonant driving signal output from the resonant driving signal data processing block 134, and the phase change amount output from the phase change amount calculation unit 133*d*1.

In the case where the MEMS mirror (mirror portion 2) is in the resonant state, the resonant sensor signal predicted-phase calculation unit 133*d*3 calculates (predicts) a predicted phase (θ+Δθ)+φ of the resonant sensor signal based on the phase change amount (see FIG. 5(*c*)) and the like every time the data acquisition completion is received. The resonant sensor signal predicted-phase calculation unit 133*d*3 adds the phase difference amount Δθ every time the data acquisition completion is received (see FIG. 5(*b*)).

In FIG. 5(*d*), a first predicted phase "(θ+Δθ)+φ" in A×sin((θ+Δθ)+φ)+B (at left end) indicates a predicted phase calculated in response to the data acquisition request (see FIG. 5(*a*)) output at time t1. A next predicted phase "(θ+2Δθ)+φ" in A×sin((θ+2Δθ)+φ)+B indicates a predicted phase calculated in response to the data acquisition request (see FIG. 5(*a*)) output at time t2. The same applies to subsequent predicted phases A×sin((θ+3Δθ)+φ)+B.

The resonant sensor signal predicted-data calculation unit 133*d*4 calculates (predicts) predicted data (signal intensity) of the resonant sensor signal, namely, A×sin((θ+Δθ)+φ)+B based on the predicted phase and the like every time the data acquisition completion is received. Note that the value B is an offset correction value (DC component, A/D converter offset correction value) for A/D conversion, and is stored in the register 136*b* of the overall control block 136. The offset correction value B is set in consideration of performance and the like of the A/D converter 50. FIG. 5(*i*) illustrates an example of the offset correction value B.

FIG. 5(*d*) illustrates an example of the predicted data. In FIG. 5(*d*), a first predicted data A×sin((θ+Δθ)+φ)+B (at left end) indicates the predicted data calculated in response to the data acquisition request (see FIG. 5(*a*)) output at time t1. Next predicted data A×sin((θ+2Δθ)+φ)+B indicates the predicted data calculated in response to the data acquisition request (see FIG. 5(*a*)) output at time t2. The subsequent predicted data A×sin((θ+3Δθ)+φ)+B similarly indicates the predicted data.

The resonant sensor signal abnormality determination unit 133*d*5 performs signal abnormality determination processing for detecting (determining) abnormality of the resonant sensor signal (see FIG. 5) output from the optical deflector 1 (first detection units 71*y* and 72*y*).

A principle for detecting abnormality of the resonant sensor signal is described with reference to FIG. 5.

In the following, it is assumed that the resonant driving signal is applied to the optical deflector 1 (first piezoelectric actuators 31 and 32), and accordingly, the MEMS mirror (mirror portion 2) is swung around the vertical axis. Further, it is assumed that the optical deflector 1 (first detection units 71*y* and 72*y*) outputs the resonant sensor signal in response to the swinging (swing angle) of the MEMS mirror (mirror portion 2). It is assumed that the MEMS mirror (mirror portion 2) is not in a non-resonant state but in the resonant state.

In the case where the MEMS mirror (mirror portion 2) is in the resonant state, the phase change amount Δθ per one data acquisition period (see FIG. 5(*c*)), the phase difference φ between the resonant driving signal and the resonant sensor signal (see FIG. 5(*g*)), and the amplitude A of the resonant sensor signal (see FIG. 5(*f*)) are stabilized. Therefore, in a case where the resonant sensor signal is normal, it is anticipated that the predicted resonant sensor signal (signal intensity) and the resonant sensor signal (signal intensity) actually acquired are coincident (substantially coincident) with each other.

In the case where the MEMS mirror (mirror portion 2) is in the resonant state, by utilizing the characteristics, the resonant sensor signal abnormality determination unit 133*d*5 compares the predicted data on the resonant sensor signal (signal intensity) with the actual resonant sensor signal data (signal intensity), and performs the signal abnormality determination processing for detecting (determining) abnormality of the resonant sensor signal (see FIG. 5) output from the optical deflector 1 (first detection units 71*y* and 72*y*) based on a result of the comparison.

For example, in FIG. 5, in a case where the data acquisition completion is output in response to the data acquisition request (see FIG. 5(*a*)) output at time t2, the resonant sensor signal abnormality determination unit 133*d*5 compares the predicted data A×sin((θ+Δθ)+φ)+B calculated in response to the data acquisition request (see FIG. 5(*a*)) output at time t2 with the resonant sensor signal data (A/D conversion result, see FIG. 5(*h*)) actually acquired in response to the data acquisition request (see FIG. 5(*a*)) output at time t2.

In a case where, as a result, a difference between the predicted data on the resonant sensor signal (see FIG. 5(*d*)) and the actual resonant sensor signal data (see FIG. 5(*h*)) exceeds a threshold, the resonant sensor signal abnormality determination unit 133*d*5 detects abnormality of the resonant sensor signal. The threshold is stored as a resonant sensor signal abnormality determination allowable error (threshold considering error of A/D converter) in the register 136*b*.

Note that the number of times that the difference between the predicted data on the resonant sensor signal (see FIG. 5(*d*)) and the actual resonant sensor signal data (see FIG. 5(*h*)) exceeds the threshold is counted, and in a case where the number of times exceeds a threshold, abnormality of the resonant sensor signal may be detected. The threshold is stored as number of times of detecting resonant sensor signal abnormality determination (number of times of detection considering temporary noise) in the register 136*b*.

In a case where the resonant sensor signal abnormality determination unit 133*d*5 detects abnormality of the resonant sensor signal, the resonant sensor signal abnormality determination unit 133*d*5 outputs a resonant sensor signal abnormality signal. The resonant sensor signal abnormality signal is stored as resonant sensor signal abnormality in the register 136*b*. In response to the resonant sensor signal abnormality signal, for example, the abnormality signal generation unit 136*c* generates and outputs an abnormality signal for power shutdown. This makes it possible to immediately cope with abnormality operation in a case where a failure occurs in the optical deflector 1 or the A/D converter 50.

Next, an operation example of the resonant sensor signal data processing block 133 is described.

Figure 11:
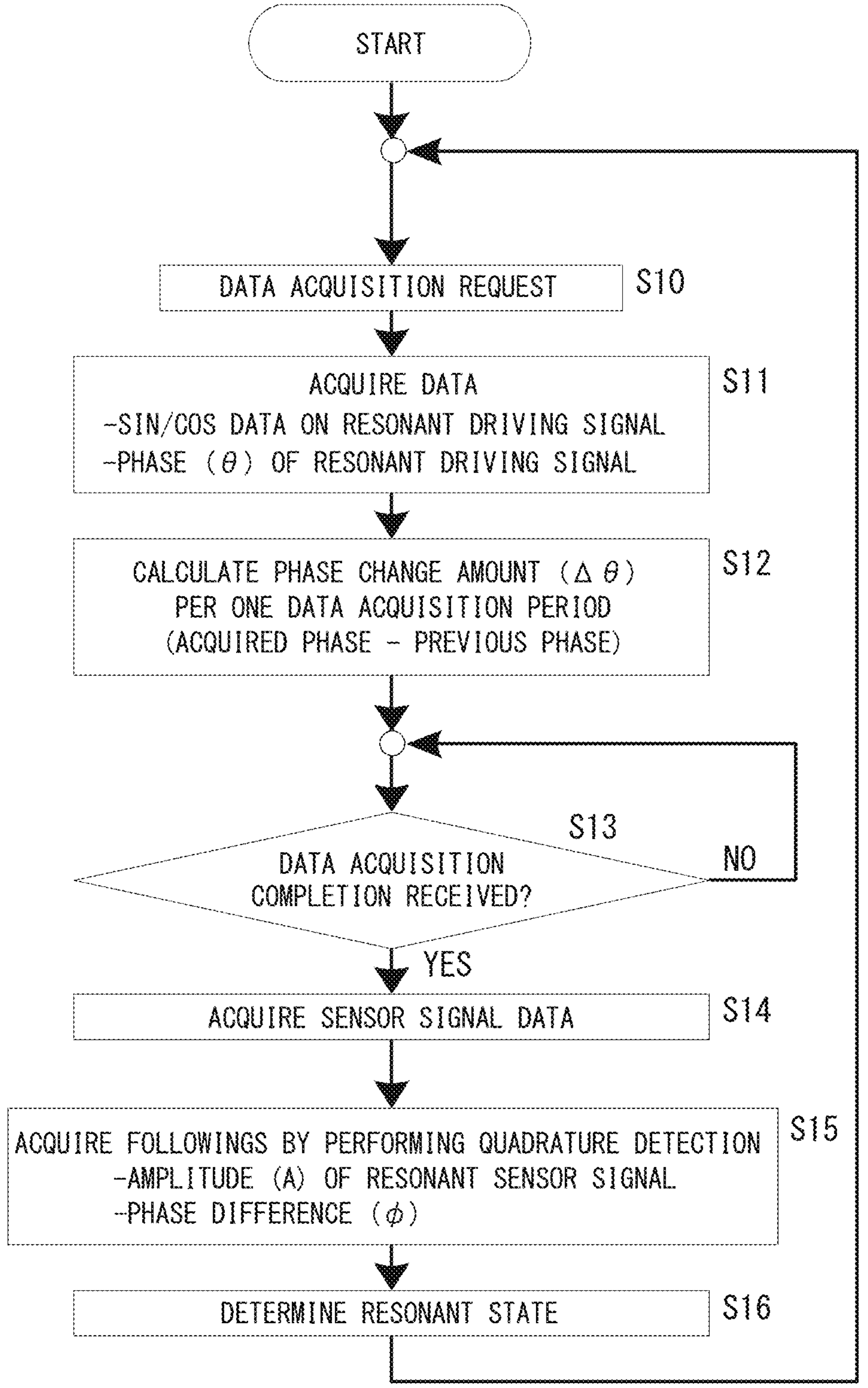
FIG. 11 is a flowchart of an operation example of the resonant sensor signal data processing block 133.

FIG. 11 is a flowchart of the operation example of the resonant sensor signal data processing block 133.

As illustrated in FIG. 11, the data acquisition request (see FIG. 5(*a*)) is first output (step S10). This is performed by the data acquisition timing generation unit 133*a*.

Next, data is acquired (step S11). More specifically, the resonant driving signal data (SIN/COS) and the phase θ of the resonant driving signal output from the resonant driving signal data processing block 134 are acquired.

Next, the phase change amount Δθ per one data acquisition period is calculated (step S12). This is performed by the phase change amount calculation unit 133*d*1.

In a case where the data acquisition completion has been received (step S13: YES), the sensor signal data (see FIG. 5(*h*)) is acquired (step S14).

Next, the amplitude A of the resonant sensor signal, and the phase difference φ are acquired by performing quadrature detection (step S15). This is performed by the quadrature detection unit 133*b*.

The reason why the quadrature detection is performed is as follows. In the case where the MEMS mirror (mirror portion 2) is in the resonant state, the value of the phase difference φ indicates 90 degrees in theory (in case of input/output signal of optical deflector 1). However, when the optical deflector 1 outputs the resonant sensor signal, and the phase difference is calculated from the data value actually acquired by the system control unit 130 through the A/D conversion, the phase difference is not 90 degrees. This is because delay occurs until the data value is acquired due to board characteristics and the like. To consider the delay, as the phase difference φ, not 90 degrees but the value actually acquired by the quadrature detection is used.

Next, the resonant state of the MEMS mirror (mirror portion 2) is determined (step S16). This is performed by the quadrature detection unit 133*b*. The determined resonant state of the MEMS mirror (mirror portion 2) is stored in the register 136*b* of the overall control block 136.

The above-described processing in steps S10 to S15 is repeatedly performed every time the data acquisition request is output.

Next, an operation example of the resonant sensor signal abnormality determination unit 133*d* is described.

Figure 12:
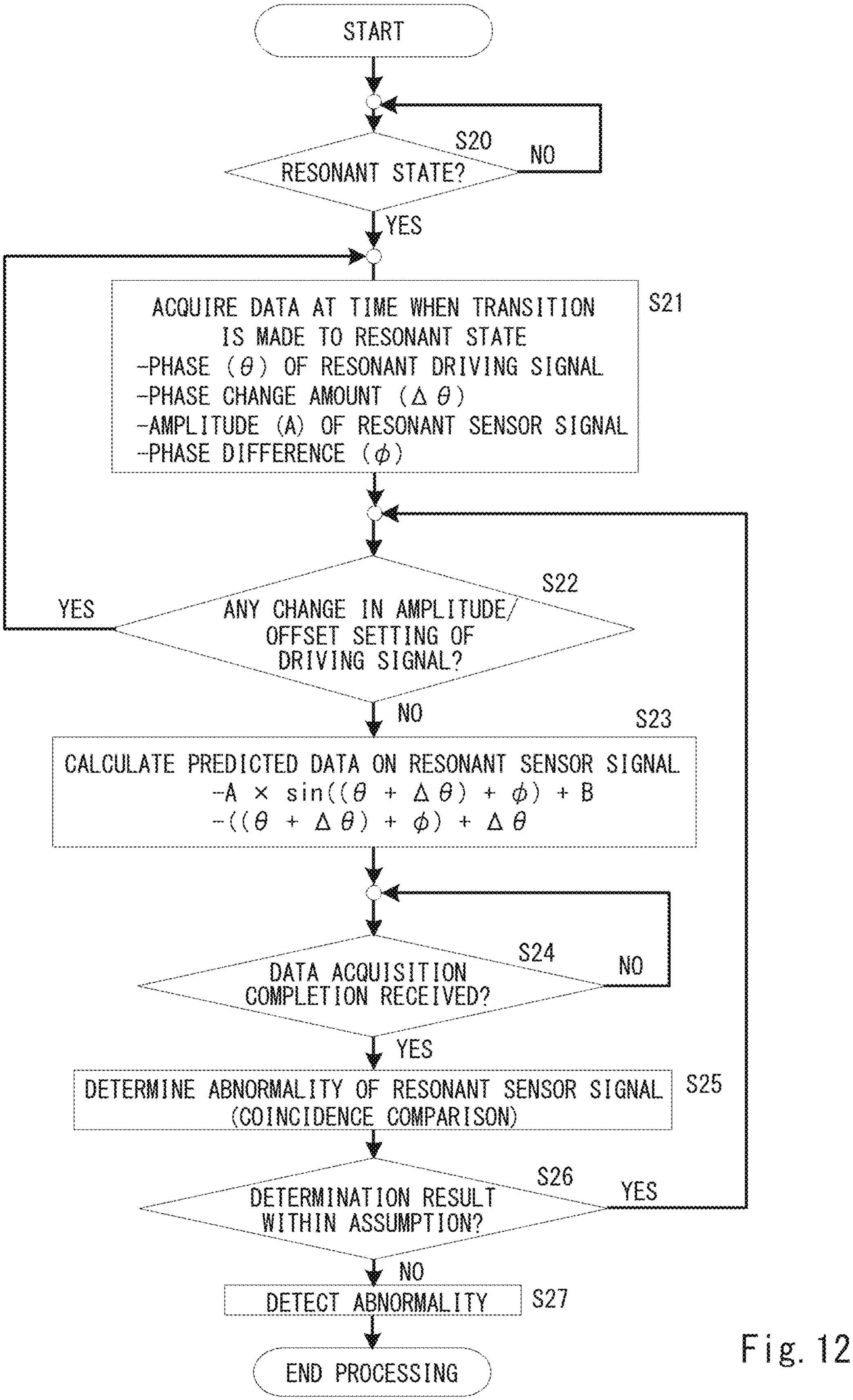
FIG. 12 is a flowchart of an operation example of the resonant sensor signal abnormality determination unit 133*d;*

FIG. 12 is a flowchart of the operation example of the resonant sensor signal abnormality determination unit 133*d*.

As illustrated in FIG. 12, it is first determined whether the MEMS mirror (mirror portion 2) is in the resonant state (step S20). It can be determined whether the MEMS mirror (mirror portion 2) is in the resonant state by referring to the register 136*b* of the overall control block 136.

In a case where it is determined that the MEMS mirror (mirror portion 2) is in the resonant state (step S20: YES), the data at the time when transition is made to the resonant state is acquired (step S21). More specifically, the phase θ and the phase change amount Δθ of the resonant driving signal, the amplitude A of the resonant sensor signal, and the phase difference φ are acquired.

Next, it is determined whether the amplitude/offset setting of the driving signal has been changed (step S22). For example, in a case where the setting value change detection unit 136*d* of the overall control block 136 outputs the change notification/change completion notification of the amplitude of the resonant driving signal, or the change notification/change completion notification of the amplitude/offset of the non-resonant driving signal, it is determined that the amplitude/offset setting of the driving signal has been changed.

In a case where it is determined as a result in step S22 that the amplitude/offset setting of the driving signal has been changed (step S22: YES), the processing in step S21 is performed again.

In contrast, in a case where it is determined in step S22 that the amplitude/offset setting of the driving signal has not been changed (step S22: NO), the predicted data on the resonant sensor signal is calculated (step S23). This is performed by the resonant sensor signal predicted-data calculation unit 133*d*4.

In a case where the data acquisition completion has been received (step S24: YES), abnormality determination (coincidence comparison) of the resonant sensor signal is performed (step S25). This is performed by the resonant sensor signal abnormality determination unit 133*d*5.

Next, it is determined whether the determination result is within assumption (step S26). For example, it is determined whether the difference between the predicted data on the resonant sensor signal (see FIG. 5(*d*)) and the actual resonant sensor signal data (see FIG. 5(*h*)) exceeds the threshold, or less than or equal to the threshold. In a case where it is determined as a result that the difference between the predicted data on the resonant sensor signal (see FIG. 5(*d*)) and the actual resonant sensor signal data (see FIG. 5(*h*)) exceeds the threshold (resonant sensor signal abnormality determination allowable error) (step S26: NO), abnormality of the resonant sensor signal is detected (step S27). This is performed by the resonant sensor signal abnormality determination unit 133*d*5. In a case where abnormality of the resonant sensor signal is detected, the resonant sensor signal abnormality determination unit 133*d*5 outputs the resonant sensor signal abnormality signal. In response to the resonant sensor signal abnormality signal, for example, the abnormality signal generation unit 136*c* generates and outputs the abnormality signal for power shutdown. This makes it possible to immediately cope with abnormality operation in a case where a failure occurs in the optical deflector 1 or the A/D converter 50.

As described above, according to the present embodiment, it is possible to detect abnormality of the resonant sensor signal (resonant sensor signal output from optical deflector in response to swinging of mirror portion) without determining whether the amplitude (phase difference) is within the allowable range.

According to the present embodiment, by detecting abnormality of the resonant sensor signal, it is possible to immediately cope with abnormality operation in a case where a failure occurs in the optical deflector 1 or the A/D converter 50.

According to the present embodiment, it is possible to immediately detect abnormality of the resonant sensor signal.

According to the present embodiment, it is possible to detect abnormality of the resonant sensor signal (resonant sensor signal output from optical deflector in response to swinging of mirror portion) with extremely small increase in circuit scale as compared with duplication of the circuit generally used as a method of detecting abnormality caused by a failure.

According to the present embodiment, periodic diagnosis by software (software load) is unnecessary. Further, according to the present embodiment, since the periodic diagnosis by software is unnecessary, performance of an application is not deteriorated.

Next, as a modified example, an example of performing feedback control on a frequency of the resonant driving signal is described.

Technical significance of feedback control on the frequency of the resonant driving signal is as follows. After the resonant sensor signal data processing block 133 determines that the MEMS mirror (mirror portion 2) is in the resonant state, a resonant frequency of the MEMS mirror (mirror portion 2) may be slightly varied due to an external factor such as an operation temperature.

In the feedback control on the frequency of the resonant driving signal, in consideration of the phenomenon, the states of the resonant driving signal and the resonant sensor signal are monitored, and the resonant frequency is finely adjusted even after it is determined that the MEMS mirror (mirror portion 2) is in the resonant state.

Figure 13:
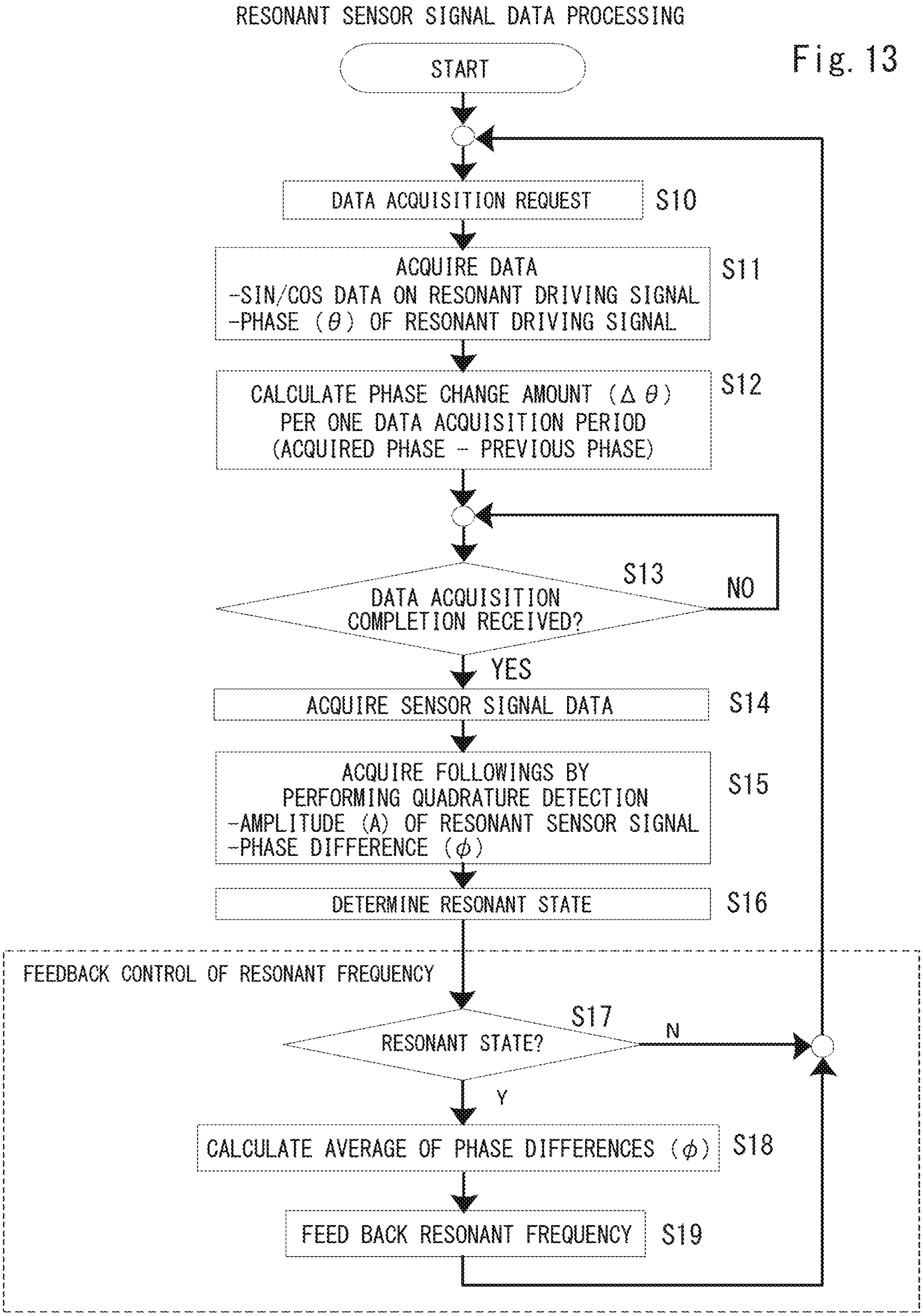
FIG. 13 is a flowchart of an operation example of performing feedback control on a frequency of the resonant driving signal.

FIG. 13 is a flowchart of an operation example in which the feedback control is performed on the frequency of the resonant driving signal.

FIG. 13 is equivalent to the flowchart illustrated in FIG. 11 added with steps S17 to S19. In the following, steps S17 to S19 that are differences from FIG. 11 are mainly described.

As illustrated in FIG. 13, subsequent to step S16, it is determined whether the MEMS mirror (mirror portion 2) is in the resonant state (step S20). It can be determined whether the MEMS mirror (mirror portion 2) is in the resonant state by referring to the register 136*b* of the overall control block 136.

In a case where it is determined in step S17 that the MEMS mirror (mirror portion 2) is in the resonant state (step S18), an average phase difference that is an average of (plurality of) phase differences p acquired in the past is calculated (step S18). The processing in step S18 is an example of an average phase calculation unit according to the present disclosure.

Next, feedback of the resonant frequency is performed (step S19). More specifically, a difference between the phase difference (for example, phase difference acquired at this time) and the average phase difference (average of plurality of phase differences acquired in past) is calculated. This is an example of a phase difference calculation unit according to the present disclosure. The frequency of the resonant driving signal is increased/reduced so as to reduce the difference between the phase difference (for example, phase difference acquired at this time) and the average phase difference (average of plurality of phase differences acquired in past). This is an example of a resonant driving signal frequency control unit according to the present disclosure.

Figure 14:
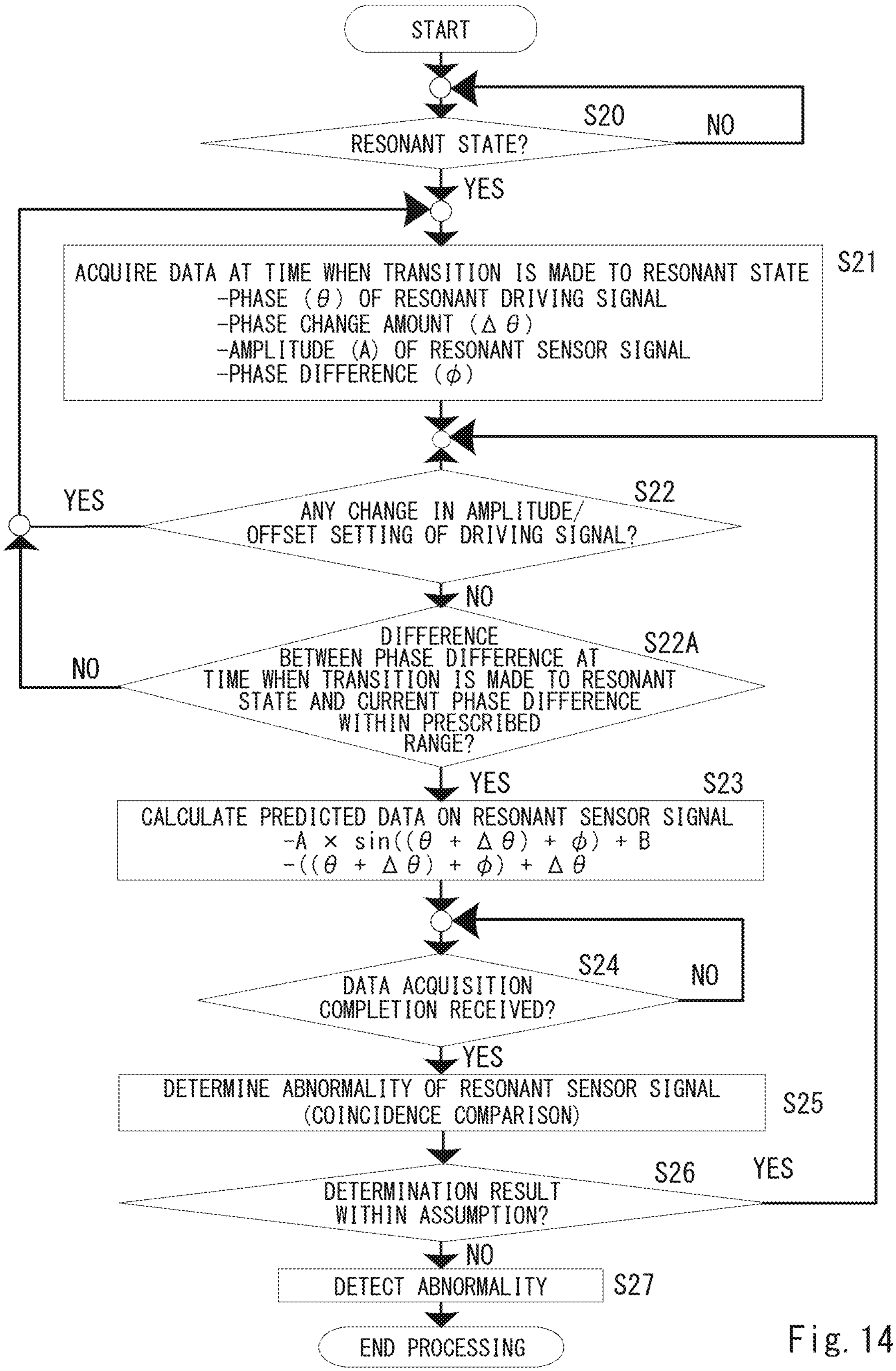
FIG. 14 is a flowchart of an operation example of performing feedback control on the frequency of the resonant driving signal.

FIG. 14 is a flowchart of an operation example in which the feedback control is performed on the frequency of the resonant driving signal.

FIG. 14 is equivalent to the flowchart illustrated in FIG. 12 added with step S22A. In the following, step S22A that is a difference from FIG. 12 is mainly described.

As illustrated in FIG. 14, subsequent to step S22: NO, it is determined whether a difference between the phase difference at the time when transition is made to the resonant state and the current phase difference is within a prescribed range (step S22A).

In a case where it is determined as a result in step S22A that the difference is not within the prescribed range (step S22A: NO), the processing in steps S21 and S22 is performed again.

In contrast, in a case where it is determined in step S22A that the difference is out of the prescribed range, the processing in and after step S23 is performed.

According to the present modified example, in addition to the effects by the above-described embodiment, the states of the resonant driving signal and the resonant sensor signal can be monitored, and the resonant frequency can be finely adjusted even after it is determined that the MEMS mirror (mirror portion 2) is in the resonant state. As a result, even in a case where the resonant frequency of the MEMS mirror (mirror portion 2) is slightly varied due to an external factor such as an operation temperature after the resonant sensor signal data processing block 133 determines that the MEMS mirror (mirror portion 2) is in the resonant state, abnormality of the resonant sensor signal can be detected.

In the case where the feedback control is performed on the frequency of the resonant driving signal as in the present modified example, deviation occurs between (1) the phase difference varied by the feedback control and (2) the phase difference φ acquired when the resonant sensor abnormality detection block determines the resonant state. This can be coped with by the following method. First, a value considering deviation of the phase difference is set to the register: 36 (resonant sensor signal abnormality determination allowable error) considering error of the A/D converter 50 and the like. Secondly, when the difference between the phase difference varied by the feedback control and the phase difference acquired when the resonant state is first determined exceeds a prescribed value, the phase difference used for abnormality detection is acquired again. The prescribed value is a constant value, or is determined based on setting in the register 136*b* or the like.

In the above-described embodiment, the example in which the optical deflector of the uniaxial non-resonant/uniaxial resonant type is used as the optical deflector 1 is described; however, the optical deflector 1 is not limited thereto. In other words, an optical deflector having any configuration can be used as long as the optical deflector includes a mirror portion, a supporting portion supporting the mirror portion, at least one actuator swinging the mirror portion around a swing axis relative to the supporting portion in response to application of a resonant control signal, and a sensor unit outputting a resonant sensor signal in response to swinging of the mirror portion.

In the above-described embodiment, the example in which the abnormality detection apparatus according to the present invention is applied to the picture projection apparatus 10 is described; however, application is not limited thereto. For example, the abnormality detection apparatus according to the present invention may be applied to a starter kit for sales promotion of an engineering sample, a development kit, and the like.

Although not illustrated, the units (units described in claims) of the picture projection apparatus 10 and steps (steps described in claims and flowcharts) are implemented when a processor executes predetermined programs that are read from a storage unit (for example, ROM) to a memory (for example, RAM). Note that a part or all of the units and the steps may be implemented by hardware.

The above-described programs can be supplied to a computer by being stored in various types of non-transitory computer-readable media. The non-transitory computer readable media include various types of tangible recording media. Examples of the non-transitory computer readable media include a magnetic recording medium (for example, flexible disk, magnetic tape, and hard disk drive), an magnetooptical recording medium (for example, magnetooptical disk), a CD-ROM (Read Only Memory), a CD-R, a CD-R/W, a semiconductor memory (for example, mask ROM, PROM (Programmable ROM), an EPROM (Erasable PROM), a flash ROM, and a RAM (Random access Memory)). Further, the programs may be supplied to a computer by various types of transitory computer-readable media. Examples of the transitory computer-readable media include an electric signal, an optical signal, and an electromagnetic wave. The transitory computer-readable media can supply the programs to a computer through a wired communication path such as an electric wire and an optical fiber, or a wireless communication path.

The numerical values described in the above-described embodiment are all illustrative, and appropriate numerical values different from the above-described numerical values can be used as a matter of course.

The above-described embodiment is merely illustrative in every respect. The present disclosure is not restrictively interpreted by the description of the above-described embodiment. The present disclosure can be implemented in other various forms without departing from the spirit or main features.

This application is based upon and claims the benefit of priority of Japanese Patent Application No. 2022-070508 filed on Apr. 22, 2022, the entire contents of which are incorporated herein by reference.

REFERENCE SIGNS LIST

1 OPTICAL DEFLECTOR
2 MIRROR PORTION
2*a* REFLECTION SURFACE
2*b* REFLECTION SURFACE SUPPORTING BODY
4 FIRST SUPPORTING PORTION
6 SECOND SUPPORTING PORTION
10 OPTICAL DEFLECTOR DRIVING SYSTEM
12 LIGHT SOURCE
14 CONDENSER LENS
18 CORRECTION MIRROR
20 CONTROL APPARATUS
21, 22 TORSION BAR
23 PROJECTION LENS
31 FIRST PIEZOELECTRIC ACTUATOR
31A FIRST PIEZOELECTRIC CANTILEVER
32 FIRST PIEZOELECTRIC ACTUATOR
32A FIRST PIEZOELECTRIC CANTILEVER
40 LIGHT SOURCE DRIVING UNIT
50 RESONANT SENSOR SIGNAL PROCESSING UNIT (A/D CONVERTER)
51 SECOND PIEZOELECTRIC ACTUATOR
51A SECOND PIEZOELECTRIC CANTILEVER
51B SECOND PIEZOELECTRIC CANTILEVER
51C SECOND PIEZOELECTRIC CANTILEVER
51D SECOND PIEZOELECTRIC CANTILEVER
52 SECOND PIEZOELECTRIC ACTUATOR
52A SECOND PIEZOELECTRIC CANTILEVER
52B SECOND PIEZOELECTRIC CANTILEVER
52C SECOND PIEZOELECTRIC CANTILEVER
52D SECOND PIEZOELECTRIC CANTILEVER
60 RESONANT DRIVING SIGNAL GENERATION UNIT
61*a* LOWER ELECTRODE PAD
61*b* FIRST UPPER ELECTRODE PAD
61*c* ODD-NUMBERED-USE SECOND UPPER ELECTRODE PAD
61*d* EVEN-NUMBERED-USE SECOND UPPER ELECTRODE PAD
61*e* FIRST DETECTION ELECTRODE PAD
62*a* LOWER ELECTRODE PAD
62*b* FIRST UPPER ELECTRODE PAD
62*c* ODD-NUMBERED-USE SECOND UPPER ELECTRODE PAD
62*d* EVEN-NUMBERED-USE SECOND UPPER ELECTRODE PAD
62*e* SECOND DETECTION ELECTRODE PAD
71*x* SECOND DETECTION UNIT
71*y* FIRST DETECTION UNIT
72*x* SECOND DETECTION UNIT
72*y* FIRST DETECTION UNIT
100 ABNORMALITY DETECTION APPARATUS
130 SYSTEM CONTROL UNIT
131 IMAGE PROCESSING BLOCK
132 LIGHT SOURCE DRIVING CONTROL BLOCK
133 RESONANT SENSOR SIGNAL DATA PROCESSING BLOCK
133*a* DATA ACQUISITION TIMING GENERATION UNIT
133*b* QUADRATURE DETECTION UNIT
133*c* AMPLITUDE ABNORMALITY DETERMINATION UNIT
133*d* RESONANT SENSOR SIGNAL ABNORMALITY DETERMINATION UNIT
133*d*1 PHASE CHANGE AMOUNT CALCULATION UNIT
1332*d*2 RESONANT-STATE DATA ACQUISITION UNIT
133*d*3 RESONANT SENSOR SIGNAL PREDICTED-PHASE CALCULATION UNIT
133*d*4 RESONANT SENSOR SIGNAL PREDICTED-DATA CALCULATION UNIT
133*d*5 RESONANT SENSOR SIGNAL ABNORMALITY DETERMINATION UNIT
134 RESONANT DRIVING SIGNAL DATA PROCESSING BLOCK
135 NON-RESONANT DRIVING SIGNAL DATA PROCESSING BLOCK
136 OVERALL CONTROL BLOCK
136*a* CONTROLLER

136*b* REGISTER
136*c* ABNORMALITY SIGNAL GENERATION UNIT
136*d* SETTING VALUE CHANGE DETECTION UNIT
A AMPLITUDE
B OFFSET CORRECTION VALUE
Ray LASER BEAM
S SCREEN
Δθ PHASE CHANGE AMOUNT
θ PHASE
φ PHASE DIFFERENCE
Fx SECOND FREQUENCY
Fy FIRST FREQUENCY
L1 LOWER ELECTRODE
L2 PIEZOELECTRIC BODY
L3 UPPER ELECTRODE
M1 INTERLAYER INSULATION FILM
M2 PASSIVATION FILM

The invention claimed is:

1. An abnormality detection apparatus detecting abnormality of a resonant sensor signal output from a sensor unit of an optical deflector, the optical deflector including a mirror portion, a supporting portion supporting the mirror portion, at least one actuator swinging the mirror portion around a swing axis relative to the supporting portion in response to application of a resonant control signal, and the sensor unit outputting the resonant sensor signal in response to swinging of the mirror portion, the abnormality detection apparatus comprising:

a data acquisition timing generation unit configured to output a data acquisition request at each prescribed period;

a resonant sensor signal processing unit including a function of A/D-converting the resonant sensor signal output from the sensor unit into resonant sensor signal data every time receiving the data acquisition request, and a function of outputting a data acquisition completion and the A/D-converted resonant sensor signal data every time the A/D conversion is completed;

a phase change amount calculation unit configured to calculate a phase change amount that is a difference between a phase of the resonant driving signal applied to the actuator and a phase of the resonant driving signal previously applied to the actuator every time receiving the data acquisition request;

a quadrature detection unit configured to acquire an amplitude of the resonant sensor signal output from the sensor unit, and a phase difference between the resonant driving signal and the resonant sensor signal;

a resonant sensor signal predicted-phase calculation unit configured to calculate a predicted phase of the resonant sensor signal based on the phase change amount every time receiving the data acquisition completion;

a resonant sensor signal predicted-data calculation unit configured to calculate predicted data on the resonant sensor signal based on the amplitude of the resonant sensor signal, the phase difference, and the predicted phase every time receiving the data acquisition completion; and a resonant sensor signal abnormality determination unit configured, in a case where the mirror portion is in a resonant state, to compare the predicted data on the resonant sensor signal with actual resonant sensor signal data, and to detect abnormality of the resonant sensor signal based on a result of the comparison.

2. The abnormality detection apparatus according to claim 1, wherein, in a case where a difference between the predicted data on the resonant sensor signal and the actual resonant sensor signal data exceeds a threshold, the resonant sensor signal abnormality determination unit detects abnormality of the resonant sensor signal.

3. The abnormality detection apparatus according to claim 1, wherein, in a case where abnormality of the resonant sensor signal is detected, the resonant sensor signal abnormality determination unit outputs a resonant sensor signal abnormality signal.

4. The abnormality detection apparatus according to claim 1, further comprising:

an average phase difference calculation unit configured, in the case where the mirror portion is in the resonant state, to calculate an average phase difference that is an average of a plurality of the phase differences acquired in past;

a phase difference calculation unit configured to calculate a difference between the phase difference and the average phase difference; and a resonant driving signal frequency control unit configured to increase/reduce a frequency of the resonant driving signal so as to reduce the difference between the phase difference and the average phase difference.

5. An abnormality detection method of detecting abnormality of a resonant sensor signal output from a sensor unit of an optical deflector, the optical deflector including a mirror portion, a supporting portion supporting the mirror portion, at least one actuator swinging the mirror portion around a swing axis relative to the supporting portion in response to application of a resonant control signal, and the sensor unit outputting the resonant sensor signal in response to swinging of the mirror portion, the abnormality detection method comprising:

a data acquisition timing generation step of outputting a data acquisition request at each prescribed period;

a step of A/D-converting the resonant sensor signal output from the sensor unit into resonant sensor signal data every time the data acquisition request is received;

a step of outputting a data acquisition completion and the A/D-converted resonant sensor signal data every time the A/D conversion is completed;

a phase change amount calculation step of calculating a phase change amount that is a difference between a phase of the resonant driving signal applied to the actuator and a phase of the resonant driving signal previously applied to the actuator every time the data acquisition request is received;

a step of acquiring an amplitude of the resonant sensor signal output from the sensor unit, and a phase difference between the resonant driving signal and the resonant sensor signal;

a resonant sensor signal predicted-phase calculation step of calculating a predicted phase of the resonant sensor signal based on the phase change amount every time the data acquisition completion is received;

a resonant sensor signal predicted-data calculation step of calculating predicted data on the resonant sensor signal based on the amplitude of the resonant sensor signal, the phase difference, and the predicted phase every time the data acquisition completion is received; and a resonant sensor signal abnormality determination step of, in a case where the mirror portion is in a resonant state, comparing the predicted data on the resonant sensor signal with actual resonant sensor signal data, and detecting abnormality of the resonant sensor signal based on a result of the comparison.

6. A non-transitory computer-readable medium storing a program for detecting abnormality of a resonant sensor signal output from a sensor unit of an optical deflector, the optical deflector including a mirror portion, a supporting portion supporting the mirror portion, at least one actuator swinging the mirror portion around a swing axis relative to the supporting portion in response to application of a resonant control signal, and the sensor unit outputting the resonant sensor signal in response to swinging of the mirror portion, the program causing a computer to function as:

a data acquisition timing generation unit configured to output a data acquisition request at each prescribed period;

a resonant sensor signal processing unit including a function of A/D-converting the resonant sensor signal output from the sensor unit into resonant sensor signal data every time receiving the data acquisition request, and a function of outputting a data acquisition completion and the A/D-converted resonant sensor signal data every time the A/D conversion is completed;

a phase change amount calculation unit configured to calculate a phase change amount that is a difference between a phase of the resonant driving signal applied to the actuator and a phase of the resonant driving signal previously applied to the actuator every time receiving the data acquisition request;

a quadrature detection unit configured to acquire an amplitude of the resonant sensor signal output from the sensor unit, and a phase difference between the resonant driving signal and the resonant sensor signal;

a resonant sensor signal predicted-phase calculation unit configured to calculate a predicted phase of the resonant sensor signal based on the phase change amount every time receiving the data acquisition completion;

a resonant sensor signal predicted-data calculation unit configured to calculate predicted data on the resonant sensor signal based on the amplitude of the resonant sensor signal, the phase difference, and the predicted phase every time receiving the data acquisition completion; and a resonant sensor signal abnormality determination unit configured, in a case where the mirror portion is in a resonant state, to compare the predicted data on the resonant sensor signal with actual resonant sensor signal data, and to detect abnormality of the resonant sensor signal based on a result of the comparison.

* * * * *